United States Patent
Codignotto

(10) Patent No.: US 7,596,606 B2
(45) Date of Patent: *Sep. 29, 2009

(54) MESSAGE PUBLISHING SYSTEM FOR PUBLISHING MESSAGES FROM IDENTIFIED, AUTHORIZED SENDERS

(76) Inventor: John D. Codignotto, 3280 Sunrise Hwy., Suite 171, Wantagh, NY (US) 11793

(*) Notice: Subject to any disclaimer, the term of this patent is extended or adjusted under 35 U.S.C. 154(b) by 469 days.

This patent is subject to a terminal disclaimer.

(21) Appl. No.: 11/356,526

(22) Filed: Feb. 16, 2006

(65) Prior Publication Data
US 2006/0143307 A1    Jun. 29, 2006

Related U.S. Application Data

(63) Continuation-in-part of application No. 09/523,274, filed on Mar. 10, 2000, now Pat. No. 7,032,030.

(60) Provisional application No. 60/123,821, filed on Mar. 11, 1999.

(51) Int. Cl.
*H04M 1/64* (2006.01)
*G06F 7/00* (2006.01)
*G06F 15/16* (2006.01)
*G06F 21/00* (2006.01)

(52) U.S. Cl. ............... 709/206; 379/67.1; 707/10; 709/232; 709/246; 713/185

(58) Field of Classification Search ............... 709/206
See application file for complete search history.

(56) References Cited

U.S. PATENT DOCUMENTS

| 5,608,874 | A | 3/1997 | Ogawa et al. |
| 5,675,507 | A | 10/1997 | Bobo, II |
| 5,710,883 | A | 1/1998 | Hong et al. |
| 5,727,156 | A | 3/1998 | Herr-Hoyman et al. |
| 5,794,039 | A | 8/1998 | Guck |
| 5,802,314 | A | 9/1998 | Tullis et al. |
| 5,848,415 | A | 12/1998 | Guck |
| 5,864,870 | A | 1/1999 | Guck |
| 5,911,776 | A | 6/1999 | Guck |
| 5,915,001 | A | 6/1999 | Uppaluru |
| 5,937,162 | A * | 8/1999 | Funk et al. .................. 709/206 |
| 5,945,989 | A | 8/1999 | Freishtat et al. |
| 6,044,372 | A | 3/2000 | Rothfus et al. |
| 6,088,702 | A | 7/2000 | Plantz et al. |
| 6,119,108 | A * | 9/2000 | Holmes et al. ................ 705/40 |
| 6,122,372 | A | 9/2000 | Hughes |
| 6,158,007 | A | 12/2000 | Moreh et al. |
| 6,230,156 | B1 | 5/2001 | Hussey |

(Continued)

*Primary Examiner*—Tonia L Dollinger
*Assistant Examiner*—Daniel C Murray
(74) *Attorney, Agent, or Firm*—Leason Ellis LLP

(57) ABSTRACT

A Message Publishing System (MPS) configured to receive a message from a sender, identify the sender as an authorized sender based on information associated with the message in comparison to data in a sender account, store the message, receive a request over the Internet for at least a portion of the message from a requestor and responsively retrieve the portion of the message, and send the portion of the message to the requestor over the Internet. In further aspects of the disclosure, a security module can implement a security scheme with reference to data in the sender account as a function of the format of the message, and the message can be converted from one format to another.

20 Claims, 14 Drawing Sheets

U.S. PATENT DOCUMENTS

| | | |
|---|---|---|
| 6,230,168 B1 * | 5/2001 | Unger et al. ................. 715/206 |
| 6,230,173 B1 | 5/2001 | Ferrel et al. |
| 6,289,382 B1 * | 9/2001 | Bowman-Amuah ......... 709/226 |
| 6,350,066 B1 * | 2/2002 | Bobo, II ...................... 709/206 |
| 6,445,694 B1 | 9/2002 | Swartz |
| 6,449,657 B2 * | 9/2002 | Stanbach et al. ............ 709/245 |
| 6,501,562 B1 | 12/2002 | Nakagiri et al. |
| 6,651,087 B1 | 11/2003 | Dennis |
| 7,032,030 B1 * | 4/2006 | Codignotto ................. 709/246 |
| 2001/0051517 A1 * | 12/2001 | Strietzel ..................... 455/414 |
| 2001/0054086 A1 * | 12/2001 | Miyahira ..................... 709/218 |
| 2002/0010794 A1 * | 1/2002 | Stanbach Jr. et al. ........ 709/245 |
| 2002/0055995 A1 | 5/2002 | Beckwith et al. |
| 2002/0163423 A1 * | 11/2002 | Kondo ......................... 340/7.52 |
| 2003/0005308 A1 * | 1/2003 | Rathbun et al. ............. 713/185 |
| 2003/0046391 A1 * | 3/2003 | Moreh et al. ................. 709/225 |
| 2005/0044155 A1 * | 2/2005 | Kaminski et al. ........... 709/206 |
| 2005/0114523 A1 * | 5/2005 | Barron et al. ............... 709/228 |
| 2005/0154887 A1 * | 7/2005 | Birk et al. ................... 713/168 |
| 2005/0228899 A1 * | 10/2005 | Wendkos et al. ............ 709/232 |
| 2006/0206922 A1 * | 9/2006 | Johnson et al. ................. 726/4 |

* cited by examiner

JOE'S DELI

123 Main Street, Anytown NY 11234
(516) 555-1234

*Last Updated: Monday, February 22 1999 at 6:33am*

Today's Specials

Monday 2/22/99

Breakfast

Two Eggs Any Style on Roll — $1.29
       w/ Coffee — $1.99

Lunch

Tuna on Roll w/ Lettuce — $2.49
Grilled Cheese Sandwich — $1.99
Roast Beef Hero — $2.99

---

ZOOM IN

---

Click here to find out how your fax machine can create webpages
(c) 1998-99 EasyWEBS

FIG 9

MESSAGE PUBLISHING SYSTEM FOR PUBLISHING MESSAGES FROM IDENTIFIED, AUTHORIZED SENDERS

This application is a continuation-in-part of U.S. application Ser. No. 09/523,274, filed Mar. 10, 2000, now pending, and claims priority under 35 U.S.C. §19(e) from U.S. application Ser. No. 60/123,821, filed Mar. 11, 1999, both said applications being entitled "Message Publishing System and Method", both of which are hereby incorporated by reference.

FIELD OF THE INVENTION

This invention relates to the electronic publication of a message, specifically to a system and method that easily enables a message to be reviewed by a mass audience.

BACKGROUND OF THE INVENTION

Various methods exist to publish a message that allows a large number of people to review it. For example, television and radio can convey messages to a mass number of people tuned into their respective broadcast. However, this type of publishing requires the people's attention at the moment the message is transmitted. If a person is not tuned into the broadcast, or is not paying attention when it is transmitted, the message will not be conveyed. This type of publishing is often referred to as Pushing, meaning that the message is pushed out (transmitted) even if no one is listening or requested the message. A major disadvantage of pushing is the inability for a person to immediately retrieve a specific message when they desire it. Often a person must wait through many undesired messages before the desired message is received. The on-demand method of publishing solves this problem by allowing a person to request (demand), then immediately receive the requested message when it is convenient or desired to do so. To accomplish this, on-demand publishing requires a two-way communication path between the sender of the message and the requestor of the message. One communication direction is used by the requestor to inform the message sender that a particular message is desired, and the other direction is used to send the message to the requestor. On-demand services have existed for many years. Services such as fax-on-demand and airline flight information systems all use a form of on-demand publishing. Some common message types that are published in an on-demand fashion include visual, textual and audio messages.

There are two common forms of on-demand publishing used for audio messages. Both rely on the use of pre-recorded or synthesized audio, but differ in the method they allow reviewers to listen to the message. The first method requires the audio message to reside on equipment connected to the telephone network. Requestors wishing to hear the message would simply dial a telephone number serviced by the equipment, and the equipment would announce the message to the caller. In order to play an audio message for more then one simultaneous caller, multiple telephone lines and associated playback equipment are needed to handle the desired number of simultaneous incoming calls. Obviously, this can become very expensive and difficult to implement, especially when the number of simultaneous callers exceeds a few hundred.

The second method of on-demand audio publishing uses the Internet to distribute an audio message. Typically, a webpage will contain a reference or hyperlink to the audio message file. When a requestor selects the reference, the audio message is sent to the requestor and played on the requestors' multimedia PC. Since webpages are typically stored on Internet servers that are designed to handle thousands or even millions of simultaneous requests, a single audio message can be reviewed by a large group of requestors at the same time. However, it is a time consuming and difficult task to put an audio message on a webpage. It includes many steps, which require special software, a computer, and the technical expertise to perform the required steps.

Another publishing method exists that is somewhat between the push and on-demand publishing methologies. Fax broadcasting uses such a method. Fax broadcasting is the sending of a single fax to many recipients. The recipients typically request to be included in a broadcast list (a list of recipients that are to receive the broadcasted fax). In a sense, they have "demanded" the fax. Since most fax machines are left powered on and ready to receiving a fax at any time, it can give the sending fax machine its full attention whenever a fax is being "broadcasted" to it. Most fax machines also print out or store the faxes they receive, allowing the user of the receiving fax machine to review the broadcasted fax when it is convenient to do so. However, fax broadcasting has several major disadvantages. Since a typical fax transmission takes a few minutes to complete, the time required to send a fax to ten thousand recipients could easily take hours or days to complete. To reduce this time, multiple fax devices can be used concurrently, with each fax device sending to a different recipient. This allows the sending of the fax to multiple recipients in the same time as it takes for a single fax device to send one fax to one recipient. Even with multiple fax devices, such a system could still be time consuming and costly to operate and maintain. Another potential disadvantage with fax broadcasting exists with documents such as price lists. Since price lists are typically updated periodically, there exists the potential for a reviewer to accidentally view an old or outdated price list because the reviewer may not know a more current list has been broadcasted or they may be unable to find it. In addition, since most fax machines print out the received faxes on paper even if they are never viewed, a large quantity of paper is consumed and often wasted when broadcasting a fax. In addition, because most fax machines immediately printout any received faxes, confidential documents are often compromised because other people may see the message before it is delivered to the intended recipient or while the message remains next to the fax machine.

The Internet has become a popular source for information and an excellent example of on-demand publishing. Information and messages, often called 'content', can be published on the Internet World Wide Web (WWW) by placing them on a 'webpage'. Once connected to the Internet, a person using a web browser can visit the various locations on the WWW and view all the information and messages contained on its many webpages. To help find what they are looking for, people often use search engines to search for various keywords or phrases related to the topic of interest. Because the Internet is always 'running', the information and messages contained on the webpages are typically available for review at any time. Product information, news, recipes, travel directions, store hours, music, software and other information and items are all available on demand, at any time of the day or night.

However, publishing a message on the Internet can be a daunting task. Currently, there exists two main ways to publish information on the Internet. The first method requires the publisher to own or have access to a computer, web publishing software, an Internet web server and have the technical knowledge to use all of these items. These requirements severely limit the number of people that can publish content on the Internet. Furthermore, even if someone possessed the equipment and technical knowledge to use web publishing software, they are limited to the features, capabilities and the manner by which the web publishing software operates. A user can not simply use any software program to create and publish content on the Internet. The software program must be specifically capable of working with webpages (i.e. HTML-type files).

The second method involves the hiring of someone skilled in the art of web publishing (often referred to as a webmaster) to create, publish and maintain the content for you. This method can be very expensive, ranging from hundreds to thousands of dollars. In addition, webmasters typically charge for each and every change that you want made to your webpage(s). With either method, the process can be time consuming and expensive, denying many people the benefits of publishing a message on the Internet can bring.

Various systems have been developed that allow a message to be reviewed on the Internet. Once such system is described in U.S. Pat. No. 5,675,507 Charles R. Bobo, II "Message Storage and Delivery System". This patent describes an invention that allows a user 'on the go' to review their own personal inbox of faxes and voice mail messages using a web browser. However, this invention is designed in a many-to-one configuration. Meaning, many third parties (friends, colleagues, clients, anyone, etc) can send a fax or leave a voice message for the one user of the invention. No one other than the single user can review the messages because the invention purposely restricts such review to just the single inbox owner for privacy purposes. Even if the reviewing security was removed from the invention so anyone can review the messages, the inventions' lack of security when accepting messages would allow any unauthorized person to post an undesirable message in anyone's inbox.

There are a few software programs available that use optical scanners to enter documents into a document imaging system and then make the documents available for viewing on the Internet using a web browser. Not only do these programs not handle audio messages, they are typically very expensive and require the user to own one or more computers and have the technical expertise to operate and maintain the entire system. In addition, the user must be physically in front of and using the PC running the document management software to publish a document. This issue alone severely limits the number of people that can use it to publish documents on the Internet.

An additional prior art exists (U.S. Pat. No. 5,710,883 "Hypertext Document Transport Mechanism for Firewall-compatible Distributed World-Wide Web Publishing", Conley B. King Jr.) that allows a user to publish webpages by first packing them into an email and sending the email to a special web server that unpacks the hypertext files and places them in a memory area on a world-wide web server. This method not only requires the sender to have the necessary tools and skills to create the webpage, but they must also create the email in a special format that is required by the receiving server machine.

Another prior art (U.S. Pat. No. 5,945,989 "Method and apparatus for adding and altering content on websites") describes an invention that allows a non-technical person to alter a websites' content using a typical telephone. However, all the various content, webpages and the website itself must already exist prior to the user placing a call to the invention to manipulate such content. Each different item of content must be pre-supplied to the invention and assigned a unique ID number before the invention will allow a caller to use that content. The caller would then call the invention and specify the ID of the content that they wish displayed on the webpage.

Not only does this two-step process severely hamper the ability to quickly add new content to a webpage, but also a computer and technical expertise is required to initially create the website, webpages and content before the invention can even work with these items.

Additionally, many systems restrict the ways in which a message can be reviewed, such as publishing the message in a non-standard format, requiring the reviewer to use special hardware or software to review it. For example, Adobe Acrobat™ is often used to publish documents on the Internet. Not only is the publisher required to specially encode the message, the reviewer is required to obtain special Acrobat Reader software so they can review the document.

In addition, most systems that publish messages on the Internet do not keep records of when and who reviews the messages. Such statistics can be very helpful to people such as advertisers who want to know how much exposure an ad got.

Additionally, most systems that publish messages on the Internet do not check the message for inappropriate content; they just blindly publish the message. It is up to the users' [of the publishing program] judgment if a message should be published or not. The invention can optionally provide an automatic publishing restriction means to prevent the publishing of a message containing prohibited content.

Also, most systems can not notify one or more people when a new document has been published. Instead, reviewers are required to constantly check the system to see if a new document has been published.

To truly allow virtually anyone to publish a message on the Internet, a solution must exist that is easy, secure and economical to both publish and review the message.

OBJECTS AND ADVANTAGES

It is a primary object of the invention to allow virtually any person or organization to easily publish a message on the Internet that can be simultaneously reviewed by a mass number of people from around the world.

It is a further object of the invention to allow a message to be published without special equipment or technical expertise.

It is a further object of the invention to allow such publishing to be easy, secure and economical.

It is a further object of the invention to allow the published message to be reviewed using a typical web browser.

It is a further object of the invention to automatically and quickly publish a message upon receiving the message from a user without any pre or post-action required from the user.

It is a related object of the invention to allow anyone with access to a common fax machine to create and maintain webpages on the Internet.

It is a related object of the invention to allow anyone with access to a common telephone to create and maintain webpages on the Internet.

It is a further object of the invention to help the user maintain and monitor their website.

It is a related object of the invention to allow for posting of timely information.

It is a further object of the invention to allow a user of the invention to obtain statistics related to how, when and who reviewed a published message.

It is yet a further object of the invention to allow a message to be published on the Internet, from a broader range of sources and methods then are currently available today.

It is yet a further object of the invention to optionally restrict access to one or more published messages based on a time or date schedule.

It is yet a further object of the invention to optionally prevent inappropriate messages from being published.

It is yet a further object of the invention to optionally allow only authorized persons to review a published message.

It is yet a further object of the invention to optionally notify one or more people when a new message has been published.

It is a further object of the invention to automatically create webpages that will host the message and allow it to be reviewed on the Internet.

It is a further object of the invention to supplement information that was published using traditional publishing methods.

It is a further object of the invention to automatically submit the published message to one or more Internet search engines, so other people can find the message based on it's contents or topic.

It is a related object of the invention to help the environment by reducing the amount of paper and energy consumed or wasted when publishing a message to a mass audience.

Additional objects, advantages and novel features will become apparent to those skilled in the art upon reading this disclosure or by practicing the invention.

SUMMARY OF THE INVENTION

To achieve the foregoing and other objects, in accordance with the present invention, as embodied and broadly described herein, a message publishing system receives an incoming message over a network along with one or more identification signals. The message is received and the ID info is used to identify the sender of the message as an authorized user of the system. The message is converted from a first format to a second format, with the second format preferably being one or more webpages. The message is stored within a storage area, preferably an Internet web server, and is retrieved from the storage area when a request for the message has been received from a requestor. The message is then transmitted to the requestor over a network, preferably the Internet.

In another aspect, a network message publishing system comprises a central processor for receiving an incoming message over a network along with identification signals accompanying the message, for identifying the sender of said message as an authorized user of the system, and for placing the message in a storage area. A network server retrieves the message from the storage area, converts the message into one or more webpages, and places the message in the storage area. When the network server receives a request for the message from a requestor over the network, the network server transmits at least a portion of the message over the network to the requestor.

Another aspect of the invention relates to a method of publishing a message for a user. The method comprises the steps of receiving an incoming message over a network along with identification signals. The identification signals are used to identify the sender of the message as a valid user of the method. The message is received in a first format, converted into a second format, and stored in a storage area. When a request for the message is received from a requestor, the message is retrieved from the storage area and transmitted to the requestor. The transmission of the message occurs over a network and the step of converting the message converts the message into one or more webpages.

In a preferred embodiment, the system receives a fax, audio, video or email message, converts it into one or more webpages and places the converted message on an Internet web server, making it accessible and reviewable by anyone using a typical web browser or similar device.

Preferably, the system would have a large number of users. Each user may pay a fee to use some or all of the system's features and services. The cost to use the system could be based on a per-use basis, a limited number of uses for a given time period or unlimited use for a periodic fee. The system could even fax, email or call each user with an account statement or invoice amount when additional money is needed to cover any debt in the users account or when a new billing period is about to start. The increasingly popular Internet "free" business model could be used with the system. With this method, the systems' service could be made available for free (or at a significantly reduced cost) to its users. Revenue is derived or supplemented by the sale of third party advertisements, such as banner ads, that are placed on one or more webpages of a user and seen by each reviewer of that webpage.

In another aspect of the preferred embodiment, the system would allow anyone with access to a fax machine to create webpages from faxed documents. For example, a restaurant or deli could fax their daily specials to the system. The system would then convert the faxed document into one or more webpages and publish the webpage(s) on the Internet. In essence, it allows the publishing and maintaining of an entire website in a manner that is familiar to the user without the need for a computer, special software or a high level of technical expertise.

Additionally, if the faxed document contains images, special image processing can be performed on the document to convert the gradual shades of an image into a dithered or error diffused pattern that will allow a clear and more accurate reproduction of the original document when it is sent as a traditional black and white fax. Software such as Xelec Corp's ClearFax can be used to accomplish this function. However, such image processing may not be necessary if the fax device supported the new ITU-T30e color fax standard. This international format allows the faxing of a document in all its full color content.

In a related aspect of the preferred embodiment, the system would allow a user with a computer to create webpages in ways currently not possible. Currently, a webpage can only be created with software specifically designed to handle HTML (or a derivative format). If a particular software program does not support HTML, it typically can not produce webpages. The system makes possible the creation of webpages using virtually any software program that supports printing to a virtual printer driver. A virtual printer driver acts somewhat like a phantom printer. You can 'print' to it, but instead of the document actually printing on a physical piece of paper, it is either handled or sent somewhere in a digital format. Software products such as WinFaX™ by Symantec act as a virtual fax printer device that allows the user to "print" to it, but instead of printing the document on paper, WinFax converts the "printed" document into a digital fax format and faxes the document to another fax device or machine that is designated by the user when the document print command was initiated. Because the system can publish these faxed documents, the user can use virtually any computer program to create webpages by simply printing (i.e. faxing) the programs' output to the system.

Alternatively, instead of faxing the document, the user could print to an alternate virtual printer driver that would convert the printed document into an intermediate digital/data format. This method could also allow the use of a color compatible virtual printer driver so the intermediate format will retain the original document's full color content instead of being converted to black and white as with most virtual fax printer drivers. The resulting color intermediate format could be sent to the system using email or another data transfer method that doesn't require a faxmodem or a telephone line like WinFax typically requires. The system would then convert the intermediate format into one or more webpages, ready to be viewed in full color by reviewers. This method would still allow a user to create one or more webpages from any application by simply printing their document to the special virtual printer driver, even if their computer does not support the faxing of a document.

In yet another related aspect of the preferred embodiment, the system would allow a faxed document to be reviewed by a mass audience faster, less expensive, and more secure then current fax broadcast methods. Currently, fax broadcasting can take hours or days to fax a single document to a mass number of people. In addition, a telephone charge is incurred for each fax sent, which can quickly add up to a significant expense. The system eliminates these disadvantages by publishing the faxed document on the Internet. Cost is virtually eliminated because there are no additional charges to the publisher for each person that reviews the document. The time needed to send the fax to multiple recipients is also virtually eliminated because the document can be simultaneously reviewed by a mass number of people as soon as it is published on the Internet. The recipients could be notified that a new message has been published via voice mail, paging or an email notification. A notification may not be needed. For example, with a price list message, a reviewer could simply check the webpage when they need a price. Because price messages are typically updated continuously by the publisher, the reviewer is assured that the prices contained in the published message are current. In addition, it is unlikely that a reviewer will view an old or outdated price lists because when each new price message is published, it replaces the old price list. The system can also significantly increase the security of a fax message. By designating a fax message as private, the system will only allow a reviewer with the correct passcode to view the fax message. Additionally, the system can greatly help the environment by eliminated the use of paper when publishing a fax message.

In still another aspect of the preferred embodiment, the system makes it possible for a user to create a webpage by simply sending an email to the system. When the system receives the email message, it can convert any text, image, video or sound information within or attached to the email into one or more webpages. In essence, the system allows the creation of webpages using any device that can send email. A PC is not required to send email. Small personal digital devices such as the 3Com Palm Pilot™ allow a user to create and send email without a PC. Some of these devices even support wireless communications, allowing a user to create webpages from virtually any physical location.

In yet another aspect of the preferred embodiment, the system makes it possible for anyone with access to a telephone to create webpages. For example, the system could record a restaurant owner announcing their specials for the day. The audio recording could then be published on a webpage allowing anyone to retrieve and play the audio message. In essence, the system allows the publication of an audio message on the Internet without any special equipment or expertise.

In a related aspect of the preferred embodiment, the system helps to increase a published message's awareness and reviewability by submitting the message to one or more searchable databases so a potential reviewer can find the message based on its contents or topic.

In yet another aspect of the preferred embodiment, the system can supplement or enhance messages or information that is published by non-Internet methods. For example, a furniture store could place a traditional ad in a newspaper. The ad could include the phrase "Visit our website at 'www.furnitureall.com' for out full line of specially priced items". Similarly, a person could place a small classified ad in a newspaper and mention in the ad that further details are available at the owner's webpage. Using this supplemental method, the person placing the ad will not only save money by being able to place a smaller ad, but the potential consumer can easily review a full set of information that otherwise would probably not be included in the printed ad due to cost restraints. Thus, both parties can benefit from the ease-of-use and low cost publishing method that the system offers.

In a related aspect, the system provides features to help the user monitor and maintain their website. For example, the system can send the user statistics on when and who viewed the various published messages, allowing the user to ascertain which messages were popular and which were not. In addition, the user can assign a date and time schedule to a message. For example, a coupon message could be configured so it will only be available for viewing during its valid period, and automatically be made unavailable after its expiration date. In addition, the system can send the user a copy of a currently published message. This will allow the user to verify that the correct messages are being displayed without the need for a PC or Internet access. For example, a user could request that the system send them a copy of the currently displayed specials. The system could then fax a copy of the requested webpage to the user, allowing them to confirm that the correct specials are being displayed to the visitors of their site.

In a main aspect, the system allows a user to publish a message in its native format. No special preparation or modification to the message is needed before it is sent to the system. The System will automatically convert, process and publish the message so it can be reviewed on the Internet by a mass number of people.

In summary, the present invention facilitates the publishing of a message to a mass audience in a manner that is quick, secure, economical and familiar to the user. It is also the intent of the present invention to advance the art for several dissimilar methods with a new, easy to use system and method. By allowing virtually anyone to easily, economically, and securely publish a message that can be easily reviewed by a mass audience, the invention opens a door once closed to many individuals. The disclosed invention incorporates these benefits, and as such, makes it idea for use as a public service, such as for newsletters or lost animal type postings, because with this system, anyone can easily post these types of items on the Internet.

BRIEF DESCRIPTION OF THE DRAWINGS

FIG. 9 is an exemplary display of a published fax page;

DETAILED DESCRIPTION OF THE CERTAIN EMBODIMENTS

Reference will now be made in detail to the preferred embodiment of the invention, an example of which is illustrated in the accompanying drawings. The term "fax" will be used interchangeable with the term "facsimile" throughout. In addition, the telephone network will be used interchangeably with the term PSTN (public switched telephone network). The authorized sender of the message to be published by the MPS will hereinafter be referred to as the user of the MPS, since they will be using the services of the MPS to publish their message or other information. The term reviewer and requestor comprise anyone (or anything) other then the above-defined user, and will also be used interchangeably to describe the one or more people (or things) that request and review a published message. In addition, the generalized term of "message" will often used to describe the various information, data or other content that the user wishes to publish on the Internet.

Figure 1:
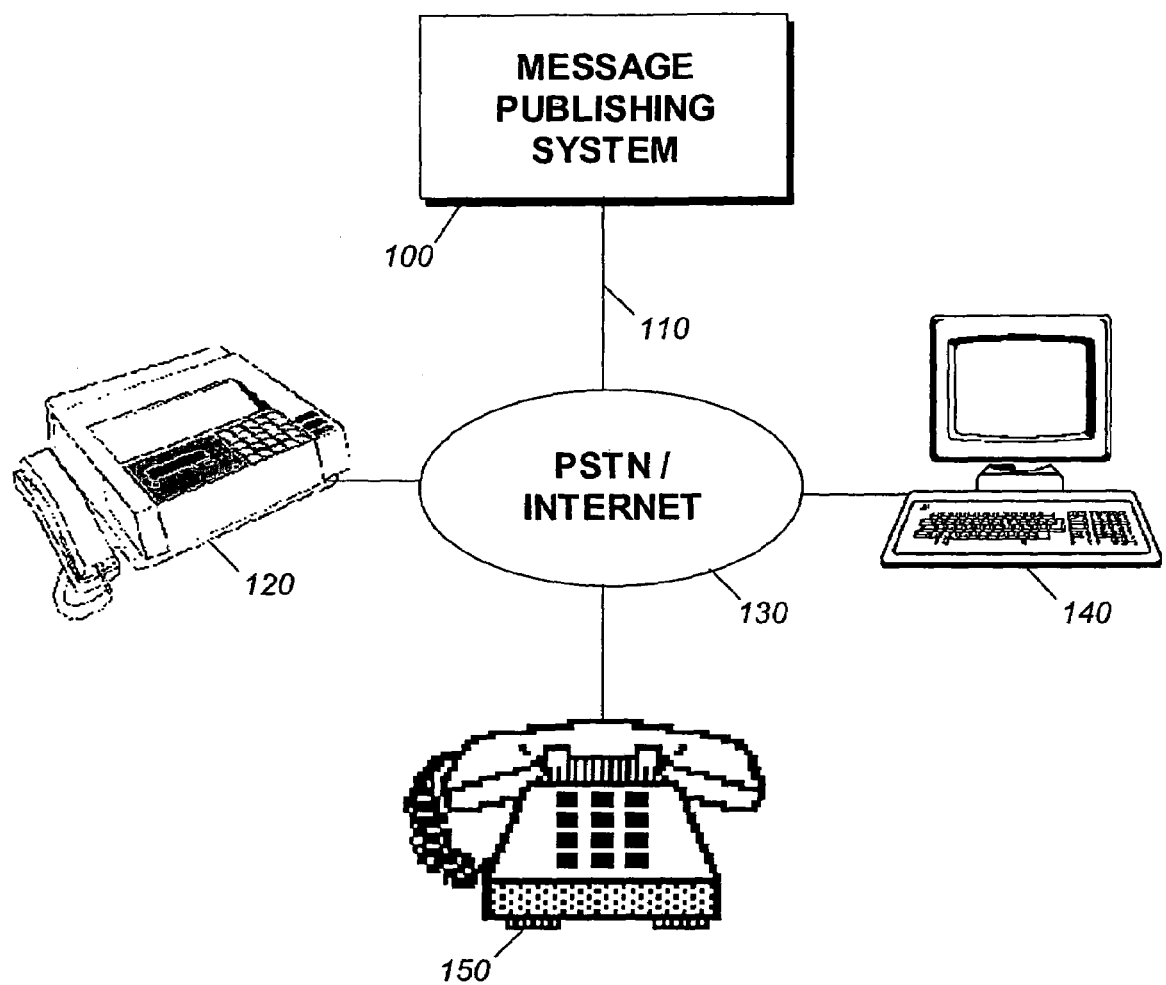
FIG. 1 is a block diagram illustrating the connections of a message publishing system (MPS)

With reference to FIG. 1, a message publishing system (MPS) 100 is connected to both the Internet and the public switched telephone network (PSTN) 130 using various connections 110 such as PSTN lines, DID trucks, T1, T3, etc. The Public Telephone Network (PSTN) and the Internet 130 have been shown as a single entity. This is because many Internet users connect to the Internet through a telephone line, and in many instances, the Internet uses the same communications pathways as the telephone network.

Preferably, the MPS has multiple telephone lines (110a in FIG. 14) to the public switched telephone network (130a in FIG. 14) and a high bandwidth connection (110b in FIG. 14) to the Internet so that the MPS can simultaneously publish and receive requests for a large number of messages.

Although the Internet (130b in FIG. 14) has been shown as a single entity, it is actually a conglomeration of computer networks and is a constantly evolving and changing structure. The system therefore is not limited to the current structure or form of the Internet but encompasses any future changes or additions to the Internet. Further, the MPS is shown as being directly connected 110 to the Internet, such as through its own node or portal. The system, however, may be practiced with any suitable connection to the Internet, such as through an intermediate Internet access provider.

The message to be published can be sent to the MPS in a number of different ways. For instance, using a telephone 150, a user could place a call through the PSTN 130 to a number that is serviced by the MPS and have the MPS record an audio message that is to be published. Similarly, a user could use a fax machine 120 to send a fax message through the telephone network 130 to the MPS. A user could also use a computer 140 to send a text message, audio message or an image to the MPS by emailing it through the Internet 130 to an email addressed serviced by the MPS.

Typically, the facsimile device 120 and the telephone 150 will connect to the MPS through the telephone network 130, and the computer 140 will connect to the MPS through the Internet 130. Telephone and fax calls can be made to the MPS using a network other then the telephone network 130. New network technologies such as Voice-over-IP, IP-Telephony, Internet Telephony, and IP-faxing have been developed to allow such activities over a data network, such as the Internet 130. Similarly, email messages might travel through the telephone network 130 during its transfer from origination to destination.

Although the fax machine 120, telephone 150 and computer 140 have been shown on separate lines connected to the Internet/PSTN 130, one or more of these devices could share a single line. While a single computer 140 is shown in the figure, the single computer may actually represent a local area network that is connected through one of the networks 130 to the MPS.

Figure 2:
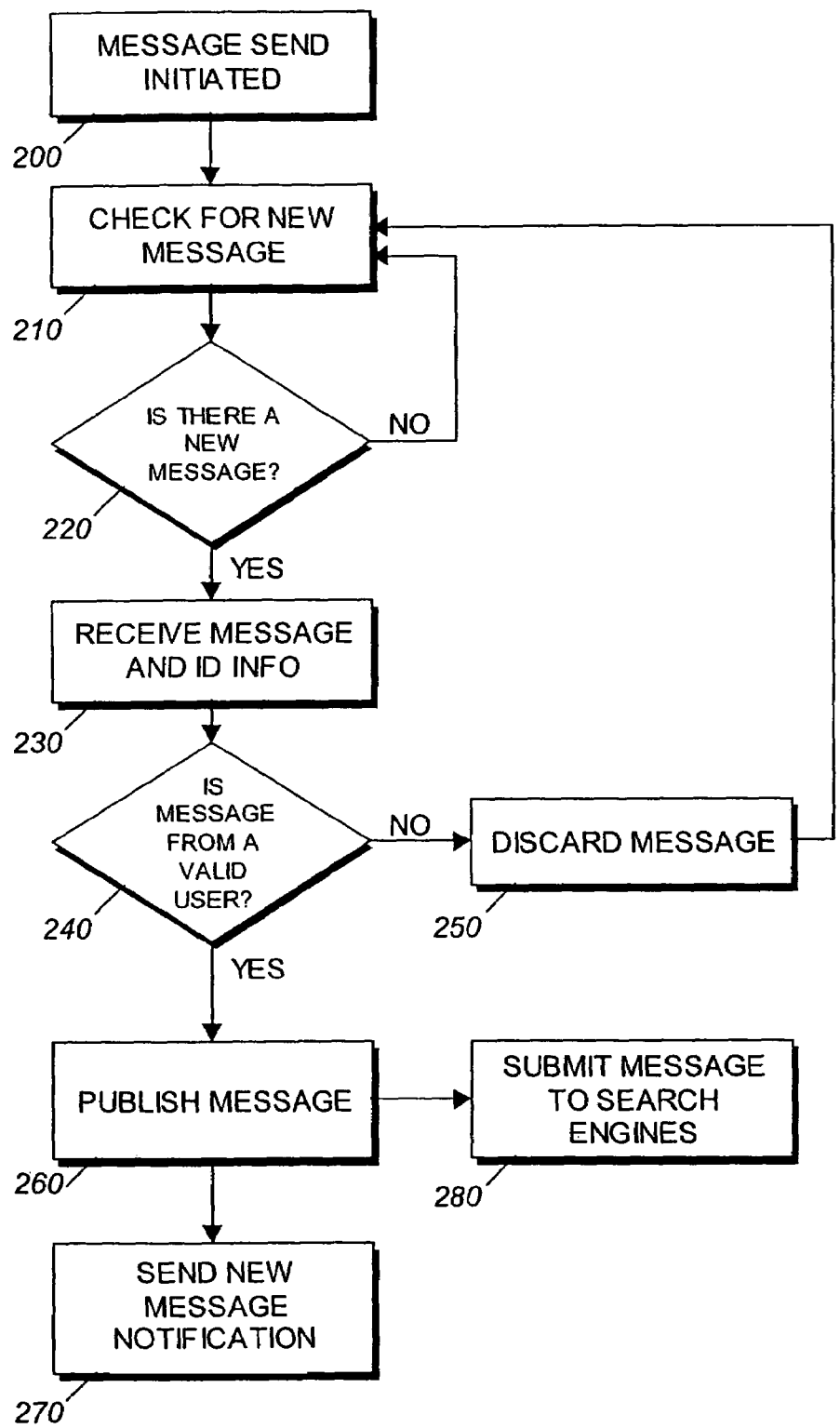
FIG. 2 is an overall flow chart of operation for receiving a message by the MPS.

With reference to FIG. 2 depicting the overall message reception operation of the system, a message transmission to the MPS is initiated by the user at step 200, for instance by using the facsimile machine 120, the telephone 150 or the computer 140. The incoming message may therefore be a facsimile message, an audio message or an email message respectively.

Step 210 comprises a message check loop. Typically, the MPS needs to continually check for new messages because some message transfer methods do not send the message directly to the MPS. Instead the message is stored elsewhere and the MPS must retrieve it. A common example of this occurs with email. Since many computers are not always on or connected to the Internet 100% of the time, it would be impossible to send an email message directly to a computer that is off or inaccessible. An alternative destination that is on and always accessible is therefore needed to receive email messages when they are sent from a sender. Typically, this is the role of a network mail server. The mail server is typically running all the time so it can receive messages for its users at any time. A mail server typically stores the users' messages until they are requested by the user. When it is convenient or desirable to do so, the recipient can turn on their computer, connect to the mail server and obtain any email sent to them since the last time that they checked their email inbox. Step 220 checks to see if there is a new message. If no new message is detected, step 210 is repeated until there is a new message. When a new message has been detected, execution jumps to step 230 where the message is received along with any accompanying ID information.

To prevent an unauthorized person from deleting, replacing or posting an undesired message, it is preferred to have a security means to limit the use of the MPS to just authorized users. This security scheme should also prevent a valid user from deleting, modifying or adding to another valid user's published messages. If a security means wasn't utilized, then anyone could replace, delete or add a message to another user's account or website. The MPS implements this security in various ways to accommodate varying balances between convenience and security for each user of the MPS. The identification and security means will herein be referred to as I&S.

Typically, when a message is sent to the MPS, it is usually accompanied by one or more identification signals. Some ID signals may indicate from where the message was sent from, and others may indicate the desired destination for the message. Some ID signals are sent before the message is transferred, some are sent within the message itself or during its transfer, and still others can be sent after the message is transmitted. The Telephone Company's caller ID signal is an example of an ID signal describes where the telephone call originated.

For example, if a user typically sends faxes to the MPS from the same fax machine, a good balance between security and convenience can be obtained by using the telephone company's caller ID signal. The caller ID signal is an example of a signal that is sent BEFORE a call is connected, because the telephone company sends the caller ID signal between the first and second incoming telephone rings. When the MPS receives the caller ID signal, it can both identify the sender (by doing a lookup for the account associated with that caller ID number) and be fairly confident that the fax is from the associated user because the phone line for that user is typically within the user's premises. Because this particular security scheme is based on a sending telephone number and not a particular person, any employee of a deli can publish the day's specials, not just the owner. This method will probably be the most often used security means because almost every telephone company supports the sending of the caller ID signal, and most users will typically send a message from the same telephone number.

A more secure means can be obtained by using DTMF ID tones. Using this method, the MPS would answer an incoming call and prompt the caller to enter some unique identification code(s) such as the users account number and preferably a passcode before the MPS will allow the caller to send a message. This method is a good example of an ID signal that is sent after a call is connected, but before the message is transferred. This method offers high security but requires the user to perform the extra step of supplying the ID tones. However, this step can be eliminated by storing the DTMF ID tones within a speed-dial button of a telephone or fax machine so it could be automatically provided to the MPS in one step. This method would also allow a user to send a message to the MPS from any location since the MPS is not relying on any ID information associated with a physical location of where the message is coming from (as is the case when using the caller ID signal), but rather from whom.

A less secure, but faster publishing method can be obtained by using the called number ID signal. This signal describes the number that is being called, not the number were the call came from. Typically, when using this method, a different telephone number is assigned to each user of the MPS. When a call comes in from a user, the MPS can identify the user by what number they used to call the MPS. For an MPS with a small number of users, each physical telephone line to the MPS can be dedicated to a single user's telephone number. It would be a simple matter to determine the called number by what physical line the call came in on, and what user has been assigned to that telephone number. However, this configuration can become both inefficient and costly to dedicate a phone line for each and every user when many users exist. In this instance, DID (direct inward dial) trunks would typically be used. Preferably, the DID trunks would contain many telephone lines that are not assigned to any particular telephone number. Each telephone line is assigned a telephone number only when a call comes in. This would allow a few DID lines to handle calls made to a much higher number of different telephone numbers. When a call comes in, the telephone company routes the call to one of the available DID lines and sends the called number ID signal to the MPS. The MPS uses this ID signal to lookup the account associated with the called number and thus identifies the user.

ID signals are also available when a message is sent over the Internet. For example, IP faxing is the term commonly used to describe the sending of a fax through the Internet. Typically, with IP faxing, a fax is sent from an ordinary fax machine to a fax-gateway device located geographically near the sending fax machine's location. The fax-gateway converts the fax into packets of digital data and sends these packets over the Internet to another fax-gateway device that is located geographically near the destination's fax machine. The destination fax-gateway device converts the data packets back into a normal fax and sends it to the destination fax machine. Since both fax gateways are located geographically near their respective fax machines, the majority of the distance that the fax data travels over is the relatively free Internet, thus the cost for a long distance fax is significantly reduced. Since the MPS is connected to the Internet, it can act as the destination fax gateway device and receive a fax sent through the Internet. Using this method, the MPS can obtain ID information by extracting the source and destination information from the packets of data making up the fax. Similarly, voice-over-IP, IP-Telephony and Internet telephony are other network-based technologies that enable telephone-like communication of voice and video over a data network, such as the Internet to the MPS.

Alternatively, a new protocol called IPP (Internet Printing Protocol) allows one computer user to print to another users' printer through the Internet. All the sender (person who is printing) needs to know is the destination printer's IP address. Since the system is connected to the Internet, it can be configured to receive incoming IPP print jobs. But instead of printing out the document, it will simply publish the document as it would any other message. Data contained in the IP packets can also be used to identify the sender of the message.

The system can also use ID info contained within the message itself. For example, if a fax message contained a barcode or other optically readable ID, an optical recognition program could be used to extract the ID info from the fax message itself. In another example, OCR (optical character recognition) software can be used to convert the graphic text within a fax into computer readable ASCII text data. This ASCII text data could then be searched for a particular keyword or phrase, which would identify the sender. In still another example, ID of the sender could be obtained by text within an email message or even the name of an attachment to an email message. In yet another example, speaker recognition technology (it identifies a particular person by their voice) could be used to identity the user by processing the users voice either as a separate security step, or by processing the actual audio message that the user recorded to be published. Alternatively, speech recognition technology could be used to convert the users voice message into ASCII text data and then search it for keywords or a passcode to identify the user.

Optionally, the extracted ASCII text mentioned above could also be scanned for inappropriate words or phrases. If such content is detected, the system could be configured to reject the message and not publish it. This additional content check could help prevent the misuse of the system. Alternatively, special image processing could be performed on images that the system receives. Such processing could utilize pattern recognition to identify various items present in an image. If inappropriate or restricted items are found, the system could prevent the publishing of the message. Speech recognition could also be used to scan audio messages for inappropriate content. The system is not limited to performing just these processes. For example, if prohibited content is found, the system could simply remove that content from a message and publish the remainder of the message. Each process could have specific criteria of what is considered acceptable and what is not. The system could be configured with different criteria for each type of message and/or for each user.

In even another method, the I&S could be based on an unapparent association, such as a time and date schedule. For example, a I&S system could be configured so that any fax received from a certain caller ID number before noon will be assumed to be one user and any faxes received from that same number after noon will be assumed to be another user. This scheme would eliminate the need for each caller to supply their account number when they call in.

A combination of ID signals can be used to create additional balances between security and convenience. For example, the called number ID method can be used with the DTMF method to allow a quicker and more secure method of identification. With this method, the MPS can use the called number ID to identify the caller so the user does not have to manually inform the MPS of their account number. The user would then only need to enter their passcode via DTMF to verify their identity to the MPS.

It is preferable that the MPS system be able to implement a different I&S for each user. This would allow each user to choose the I&S that best meets their particular I&S needs. Additionally, a user could have different I&S schemes for each type of message that they may send to the MPS. For example, a user's account could be configured to require only a certain password within the subject text of an email message when an email message is being published, but require a DTMF passcode when an audio message is being published, and require only the caller ID number for publishing a fax message.

The system could also be configured to accept messages from an unknown sender, but not publish the message until a valid user OK's the publishing of the message. This would allow a third party to create the message and send it to the system for proofing by the authorized user. If the user OK's the message, they can instruct the system to publish the message.

Additionally, the system could be configured to accept more then one passcode or ID per user account. This would allow a storeowner to give each employee their own ID while still maintaining the one user account. With this configuration, it is preferable that the system keep audit trails of when and who used the account and what they did. This way, if a message was posted by mistake, the audit trail can be used to see what employee published it.

Additionally, identification signals can be used by the system to determine where the incoming message should be stored. When a user publishes a message, the message is typically stored in the user's storage area. However, the storage location for a message could be decided by other means. For example, the sender could inform the system to save page 1 of a fax message in a particular storage area, but save the second page of the same fax message into a different storage area.

The above are only examples of common ID signals. The system is not limited to using just these signals. Any information accompanying, associated, attached or within a message may be used by the system to identify the sender of a message as a valid user. Additionally, different ID info can be received by the MPS at different times. Due to the large number of permutations that can exist by using different combinations of ID signals, methods and when they occur, it would be impractical and confusing to describe them all here. However, it is preferable that a caller not be allowed to operate the MPS or publish a message until the MPS has sufficient ID information to identify the sender of a message as an authorized user of the MPS.

For example, lets say a users' account is setup to use the fax terminal ID (an ID signal sent from the sending fax machine and usually set to the fax machines' telephone number) for I&S. The fax terminal ID is only transmitted when the fax message is being transmitted. Because of this condition, the system could allow the reception of a fax message even though it has not identified the sender yet. After the fax message has been received, the system would then check whether the fax is from a valid user. If it is not from a valid user, the fax is discarded. However, if instead of sending a fax message, the user tries to select another option, such as the users' preferences menu, the system would immediately prompt the caller to identify him or herself. This would happen because since a fax message has not been sent yet, the system does not know who the caller is, and thus should not let the caller access the system until they have been identified as an authorized user of the system. In other words, the system will not publish a message or let a caller operate the MPS until it has been determined that they are an authorized user of the system.

Alternatively, the security means can be provided by a company's own LAN. In this example, the LAN could be configured to allow company use only, thus limiting use of the system to just employees of the company.

Additionally, the system may not need a security means. For example, if there is only one user of the system, then all messages received can safely be assumed to be from that one user.

With reference again to FIG. 2, at step 240 the MPS uses any ID information contained within, associated or accompanying the received message to identify the sender of the message as an authorized user of the MPS. If the sender can not be identified as an authorized user, the message is discarded at step 250 and the system returns to step 210, waiting for a new message.

Once the sender has been identified as a valid user of the system, step 260 publishes the message. A more detailed discussion of this step will be discussed later with reference to publishing each type of message.

When publishing a message, it is preferable that the system allows the user to specify whether a published message should be public or private. A public message can be reviewed by anyone requesting it. A private message is one that should only be viewed by one or more authorized persons. When a message is designated as private by the user, a passcode is required to review it. Typically, the user would specify the passcode when they publish a private message. Later, when the private message is requested, the system will prompt the requestor to enter the passcode. If the passcode that the requestor entered is the same as the one the user assigned for the private message, the message is then transmitted to the requestor. If the requestor did not supply the correct passcode, they are denied access to the message. A typical example of a private message could be a wholesale price list. Using this method, the user would publish the wholesale prices and inform all their dealers of the message's passcode. Only those who where informed of the passcode would be able to view the private price list. A private message could have only one passcode or multiple passcodes that would allow it to be reviewed. If a private message has only one password, anyone using that password would be allowed to view the message. However, it may be desirable to issue a different password to each potential reviewer. By giving each reviewer a different password, it can be easily determined who reviewed a message by what passwords were used to view the message and who was assigned those passwords. Using separate passwords for each reviewer would also allow one or more reviewers to be denied access to a private message by simply deleting their respective passwords from the "approved" list. There would be no need to reassign passwords to the already existing approved reviewers.

Private publishing can also be used to replace or augment fax broadcasting. As described previously, traditional fax broadcasting can be time consuming and expensive. By using the system to publish a fax message, both the cost and the time required for multiple recipients to review the message is greatly reduced. The cost is reduced because multiple, possibly long distance phone charges are eliminated by using the Internet to review the message. The time is reduced because the message can be reviewed by thousands of recipients within a few minutes of when it is published. For example, when a user publishes a private fax message, the system could instantaneously notify all the desired recipients that a new message has been posted (published). Each recipient could then review and/or print out the message at their convenience.

Step 270 notifies one or more potential reviewers that a new message has been published. This notification could not only be used to alert one or more people to the possibility that important information has been published, but it could save a potential reviewer much time because they would not have to keep checking for a new message, they would simply wait to be notified when a new message has been published and is available for review.

Typically, people would subscribe to a notification list associated with a particular user or message on the MPS. For example, customers of a deli could subscribe to the deli's notification list so they will be notified when the day's specials are published. Notifications could be performed via email, paging, voice mail or many other ways. Email notification is preferable because it can simultaneously notify multiple people virtually instantly. Typically, an email listserver would be used to handle the task of emailing all the subscribers on a user or messages' notification list. In addition, most reviewers will likely have an email account because they will often review the messages through the Internet using their computer and ISP.

Figure 13:
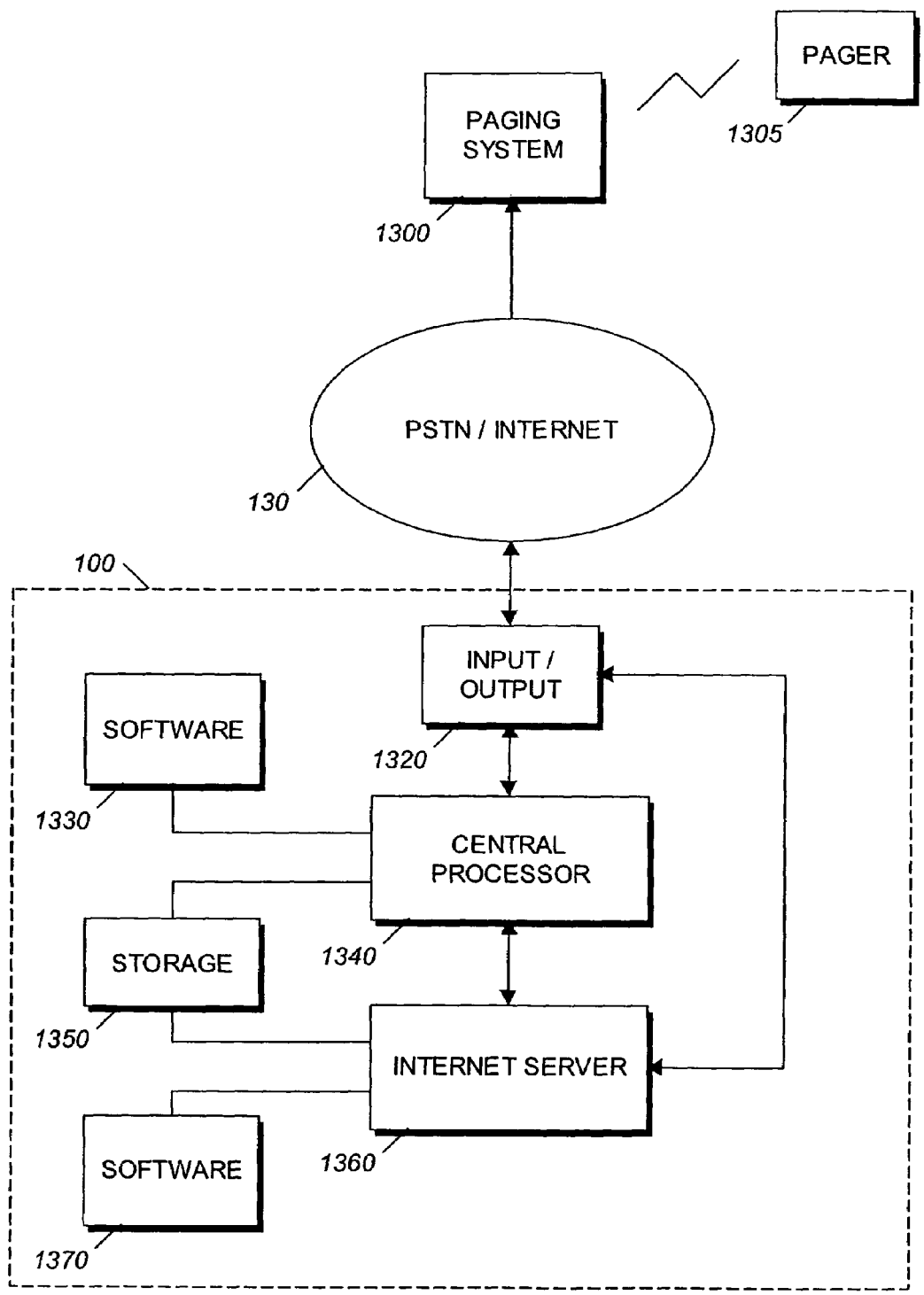
FIG. 13 is a block diagram of the MPS.

With reference to FIG. 13, the MPS may also be connected to a paging system 1300 through a network such as the Internet or the PSTN. Upon the publishing of a new message, in addition to email and other notification methods, the MPS could page one or more reviewers by activating the reviewers' pager 1305 or other notification device. In this manner, one or more potential reviewers could receive almost instantaneous notification that a new message has been published by the MPS. The paging system is preferably one that transmits alphanumeric characters so that a message may be relayed to the reviewer's pager, perhaps even part of the published message itself. The MPS would use the software 1330 to generate a paging format such as XIO/TAP that is recognized by the paging system.

In addition, the notification itself could contain a portion or the complete message that was published, serving as an alternate or additional method of publishing the message. For example, the text of a published email message could be sent within an email notification to reviewers, eliminating the need for the reviewer to view the message's webpage. Each notification method may require the published message to be converted into a format that is compatible with the notification method. For example, if a fax message was published, OCR technology can be used to convert the fax image's text into ASCII text data, which can then be paged to reviewers via alphanumeric pagers. Another example could convert the text of an email message into spoken words using Text-to-Speech technology, and the resulting audio message could be announced to reviewers via a telephone call notification or voice mail.

The amount and type of information that may be sent to the potential reviewers may vary according to the capabilities of the notification means and may provide a greater or lesser amount of information than the examples provided.

It is preferable that a published message can be found when a potential reviewer is searching for messages containing specific words or related to a specific topic. The system allows such search and retrieval by automatically submitting the user's messages to one or more Internet Search Engines. Search engines are used by most surfers to find webpages or other content related to a specific topic of interest. Typically, an Internet user will enter keywords that are related to the topic of interest, into one of the many search engines available on the Internet. The keywords are typically chosen based on the high chance that they will be included in a webpage of the desired topic, but at the same time have a low chance of being included in a webpage of an undesired topic. For example, if a user wanted to search for webpages related to the ocean, they wouldn't want to initiate a search that includes the word "The" because almost every webpage in existence includes this word and thus will be included in the search engine's "hit list" (results). A more effective search could be performed by submitting the keyword "ocean", or if they are really looking for information on lobsters, then they should submit the word "lobster" to limit the search engines' results to just webpages containing the word "lobster" in it. Step 280 submits the published message to one or more search engines so a potential reviewer can find the message by performing a keyword or topic search of the message.

Figure 3:
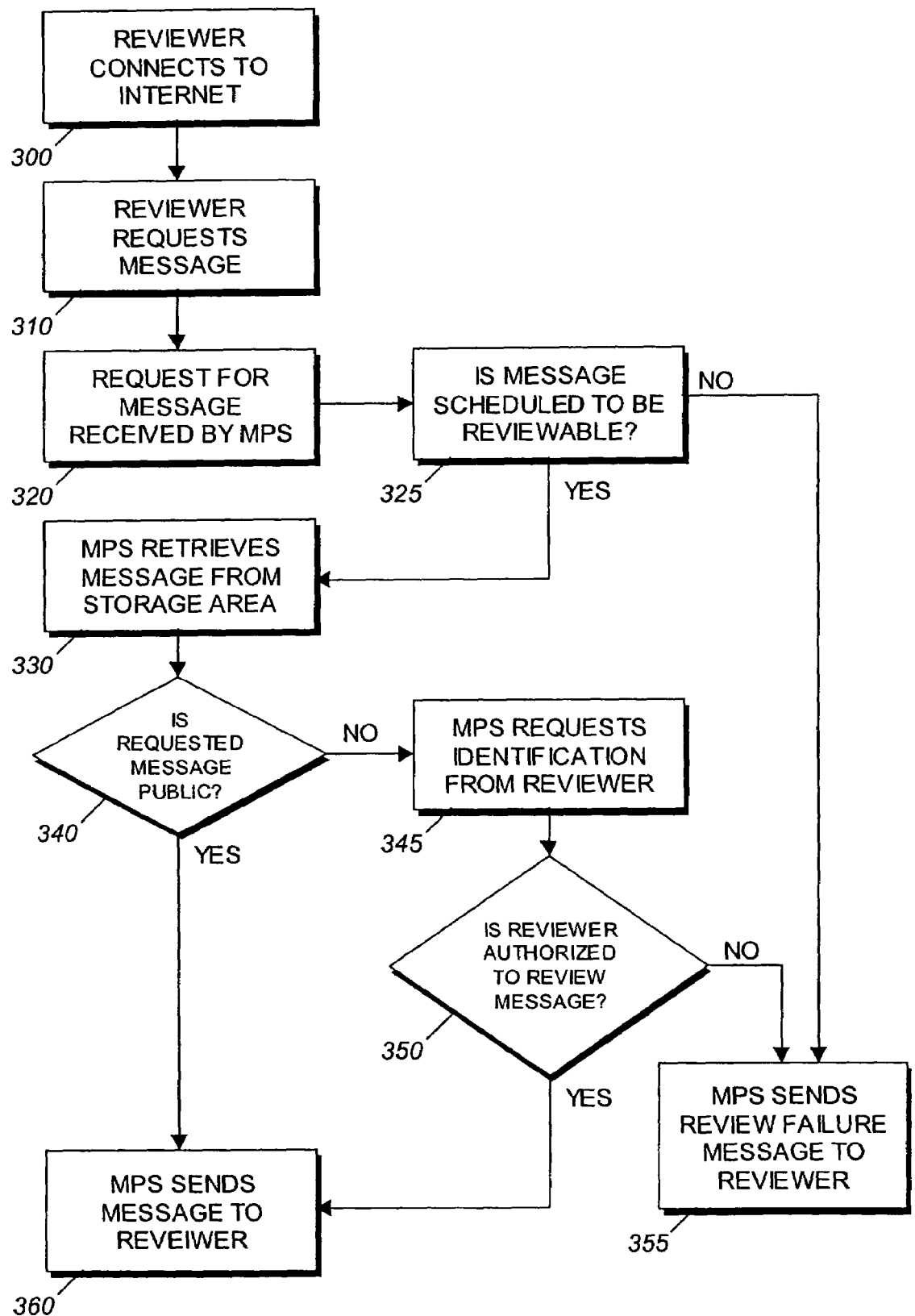
FIG. 3 is an overall flow chart of operation for retrieving a message stored at the MPS.

With reference to FIG. 3, after the MPS publishes a message, it is ready to be reviewed. One or more reviewers can then communicate with the MPS at any time and from any location in which they can connect to the Internet and request the message stored on the Internet server (1360 in FIG. 13). At step 300, the reviewer first connects to the Internet, such as with a personal computer 140 (in FIG. 1) which may be connected to the Internet in any suitable manner, such as through its own portal or node or through some intermediate access provider. The personal computer is not limited to a single computer but may instead comprise a network of computers, such as a local area network within an office.

Once connected with the Internet, at step 310, the reviewer accesses, with a hypertext web browser, the Universal Resource Locator (URL) associated with the published message. The reviewer may use any suitable hypertext browser, such as Netscape Navigator or Internet Explorer to access the message. The Internet server 1360 of the MPS receives the request for the message from the reviewer at step 320. At step 325, the system checks to see if the requested message is scheduled to be reviewable. The reviewability of a message will be discussed later in greater detail with reference to the various times at which the publishing process may occur. If step 325 determines that the message is not scheduled to be reviewable, then the process is routed to step 355, which reports the review failure to the requestor. If the requested message is scheduled to be reviewable or does not have any time restraint of being viewable, the process is routed to step 330.

At step 330, the requested message is retrieved from the user's storage area. At step 340, the MPS checks to see if the message is public, meaning that the user (sender) of the message designated that it can be reviewed by anyone requesting it. If the message was determined to be public, the MPS sends the message to the requester at step 360 through the Internet. If the message is private, the MPS at step 345 requests identification from the reviewer. The reviewer then supplies their ID and/or password. At step 350, the MPS checks to see if the reviewer is authorized to review the private message. If the reviewer is found to be authorized to review the message, the MPS sends the message to the reviewer at step 360. If the reviewer is not authorized to review the message, the MPS sends a review failure message at step 355 to the reviewer. Also, if for any reason the request is invalid, such as when a hacker is attempting to gain unauthorized access to a message or the system, the request for the message will be terminated. Once the message is received by the reviewer, the message can be displayed, played, printed out or saved for further review.

Since the MPS can receive messages of various types, such as a facsimile, audio or email messages, the MPS typically needs to determine the type of message that is being received so that it can publish the message accordingly. For messages received over the Internet or another data network, this can be easily accomplished by the method used to receive the message. For example, if a POP3 or other common email protocol was used to receive a message, the message would therefore be an email message. If an IP fax protocol was used, the message is a fax and so on. Additional information accompanying the message such as the header, packet data, data descriptors, and the actual format of the message can also be used to determine the type of message. For example, if an email attachment is named "TEST.JPG", the attachment is a JPEG image file. As will be apparent to those skilled in the art, the system is not limited to any particular method used to identify the type of message. Preferably, the MPS would continually monitor for new messages being received over the Internet or other data network. When an incoming message is detected, the system would receive the message and publish it according to its type. These publishing methods will be discussed in further detail with reference to FIG. 8, FIG. 6. and FIG. 12 respectively.

While the MPS monitors for messages coming in over the Internet, it also monitors for incoming telephone calls. An incoming phone call could be an incoming fax message, an audio message or simply a user wishing to access their account information or preferences.

Figure 4:
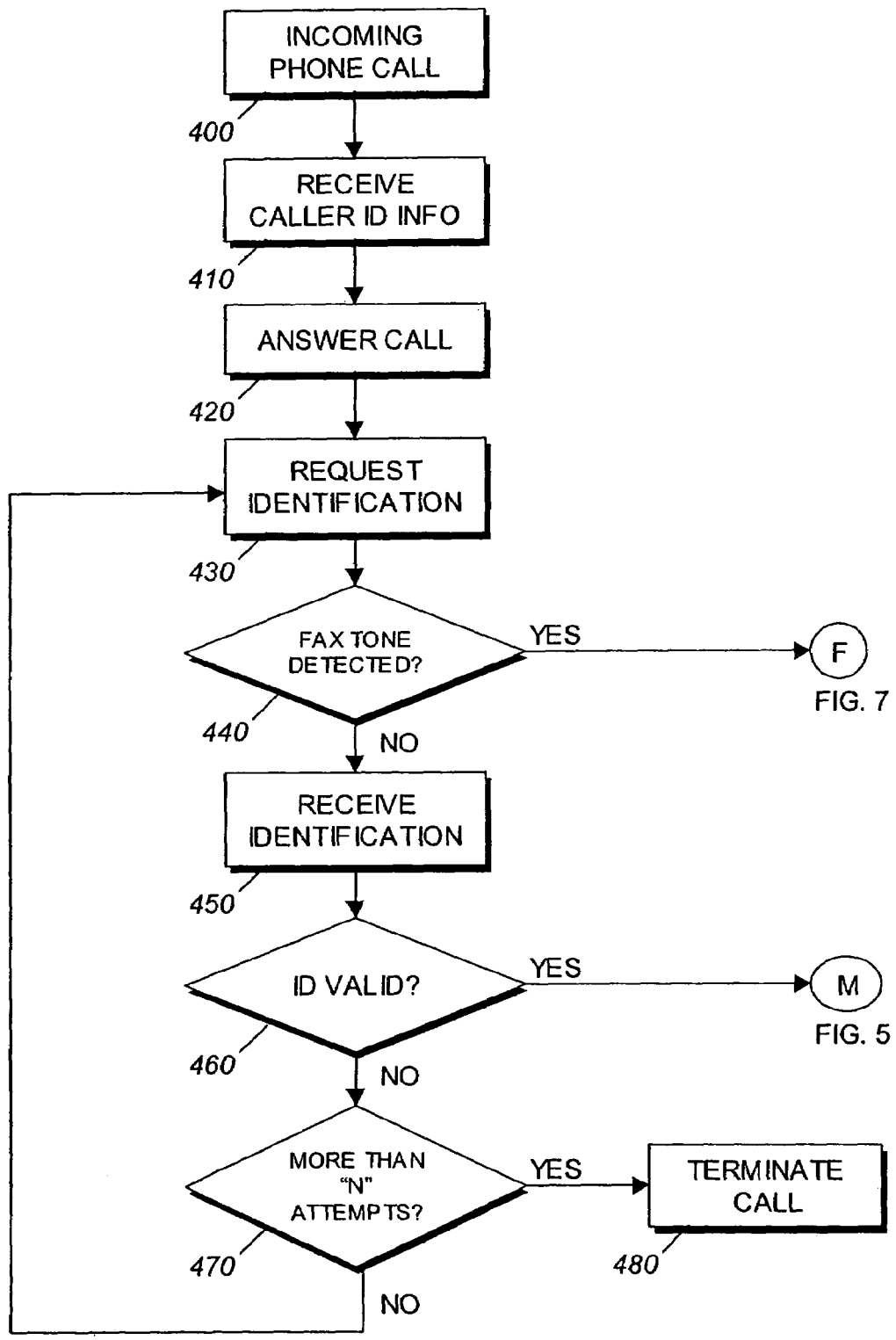
FIG. 4 is a flow chart of initial operations for answering a telephone call.

With reference to FIG. 4, when an incoming phone call is detected at step 400, the MPS attempts to receive the caller ID info if it is present at step 410. The MPS then answers the call at step 420. If a caller ID signal was received and it is associated with a valid user of the MPS, the MPS may simply prompt the caller, at step 430, to enter their passcode using the DTMF keys on their touch-tone phone. If the caller ID information was missing or it did not match up to any known users of the MPS, the MPS may prompt the caller, at step 430, for their MPS account number as well as their passcode. It is preferable for the system to use any information it can obtain about a caller, such as the caller ID, to identify the caller and thus eliminate the need for the caller to manually identify himself to the system.

While the MPS is waiting for the user to identify himself, it is also monitoring for a fax calling tone (CNG) at step 440. A fax calling tone may indicate that a fax is being sent to the MPS. If a fax calling tone were heard, the MPS would route the call to and initiate the fax receival process (via circled "F") which will be discussed in further detail with reference to FIG. 7. If no fax tone is heard, the MPS attempts to receive the ID info at step 450. Step 450 would typically wait a certain amount of time, preferably ten seconds, for the user to enter their ID info via DTMF digit key presses. Step 460 then checks to see if the available ID information confirms the caller as an authorized user of the system. If the caller has been identified as an authorized user of the system, the MPS routes the call to the systems' main IVR menu (via circled "M") which will be discussed in detail with reference to FIG. 5.

If a fax tone was not detected and the ID info was invalid or not supplied, the system, at step 470, will repeat the identification prompt at step 430. If after n attempts no fax tone has been detected or a valid ID has not been entered, the system jumps execution at step 470 to step 480 which disconnects the call and returns to waiting for a new message. The specific number "n" may be three so that the call is terminated after three failed attempts.

Figure 5:
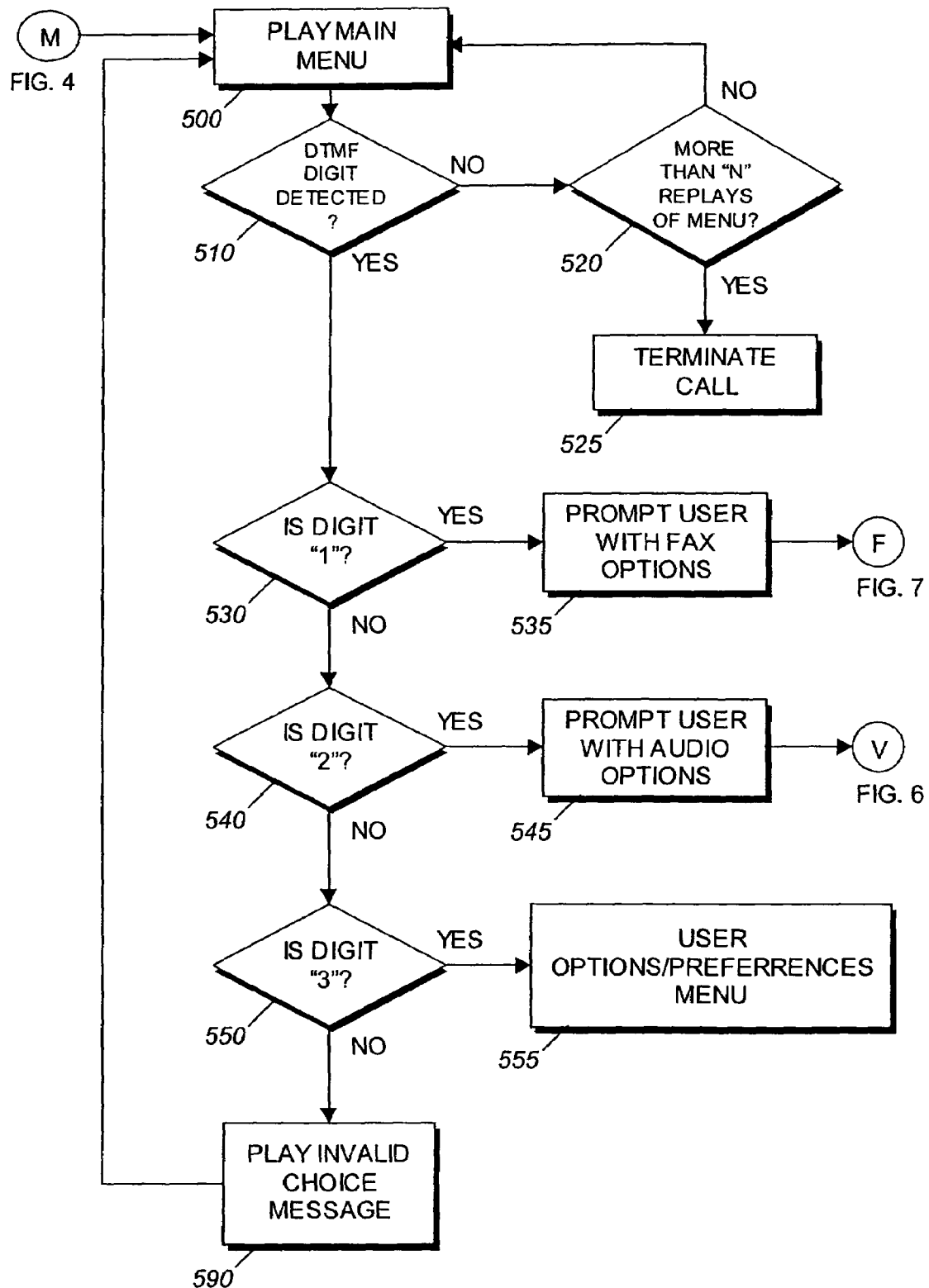
FIG. 5 is a flow chart of operations for interacting with a user's call.

With reference to FIG. 5, once the caller has been identified as an authorized user of the MPS, the main IVR (interactive voice response) menu is announced to the user at step 500, prompting them for a selection. The main menu would typically include the options for the user to; 1) publish a fax, 2) publish an audio message or 3) enter the user mode.

If the user presses the "1" digit, this would indicate that they wish to send a fax message to the MPS for publication. Step 530 would detect the "1" digit and route the caller to step 535 which would announce various options associated with publishing a fax message. A typical fax option may included prompting the user to select whether the published fax should replace any existing message in the users storage area, or simply be added to the rest of the existing messages for that user. The replace option would typically be used to update a message, such as a deli's specials, since the previous days specials may no longer be valid and should be replaced with the current days specials. The add option would typically be used to publish a new message without it replacing any existing messages. Preferably, when the user selects the add option, the system will prompt the user for a message ID to be assigned to this new message for future reference. For example, when the deli owner first publishes his breakfast specials, let's say he assigned ID #001 to that message. Then, at a later time, he could replace that message with a new message by simply informing the system of what message ID he wants to replace. Another option could let the user delete an existing message, such as a coupon that expired simply by entering the message ID of the message they want to delete. Alternatively, the system could be configured to automatically assign an ID to all new messages and inform the user of the assigned ID by means such as faxing a listing of all the user's messages along with their respective ID's. Additionally, the system could be configured to automatically delete a message (such as an expired coupon) after a specified number of days after it was published.

Another fax option might allow the user to specify whether the fax message is to be public or private. If a fax message is designated as public, it can be reviewed by anyone requesting it. If a message is designated as private, such as a wholesale price list, the reviewer must submit the correct passcode in order to review it. If the user selects the private option, the system could then prompt the user to enter the passcode that would be required to review the message. Another option could allow the user to specify whether the fax should be rotated, such as in landscape or portrait mode to allow for proper viewing of such documents.

In addition, there could be an option that allows the user to request a copy of an already published message. When this option is selected, the system would prompt the user for the ID of the message they want a copy of. The system could then read the text of the message to the user using TTS (if the requested message is a non-audio message), play the message to the user if it is an audio message, or even fax a copy of the message to the user for their review. Thus, allowing a user to confirm what is being displayed to surfers, without the need for a PC or Internet connection. Other options will become apparent after reading this disclosure and practicing the invention.

After the user is done specifying options for publishing the fax, the MPS would instruct the user to start sending the fax document [to the MPS] that is to be published. The call is then routed to the fax receival process (via circled "F") which will be discussed in further detail with reference to FIG. 7.

Returning reference to FIG. 5, if the user presses the "2" digit, this would indicate that they wish to publish an audio message. Step 540 would detect the "2" key press and route the caller to step 545 which would announce various options associated with publishing an audio message. Options such as add/replace/delete and public/private as mentioned with reference to fax options could also be offered. Another audio option may include prompting the user to select whether the published audio message should be in a WAV format, a Real Audio™ format or in both formats by creating two separate files of the same message. As mentioned previously, other options will become apparent after practicing the invention and reading this document. After the user is done specifying options for publishing the audio message, the call is routed to the audio message recording process (via circled "V") which will be discussed in further detail with reference to FIG. 6.

To assist the user in replacing an old message with a new message, the system could track each message with a unique ID. This way, if a user wishes to update a message, they only need to supply the ID number of the message they wish to update. The system would then replace the old message (with that ID) with the new message. The system could automatically assign this ID when a user publishes a new message, or the user could manually assign the ID when publishing a new message. For example, the user could assign an ID to a message by using the DTMF digits of a telephone, or by using Speech Recognition, the user can say the ID of the message and the system will record that ID as being associated with that particular message. In addition, data within the message itself could also be used to assign an ID to a message. For example, the contents of the subject field of an email message could be used to track the message. Additionally, the system could assign different IDs to different portions of a message such as each page of a multi-page fax message. The ID number could also be used to delete content by simply providing the system with the ID of the content the user wishes to delete.

There are many possible ways to assign a unique ID to a message or part of and the system is not limited to any particular method. Once an ID number is associated with a specific message or part thereof, it can be used to identify that content throughout the various operations of the system.

The system is not limited to just receiving fax or audio messages via a telephone call. For example, if the caller uses a videophone type device to call the system, they can publish a video message as simply as publishing an audio message. Additionally, with the use of technologies such as voice-over-IP and IP-faxing, telephone-like calls can be placed over a data network, such as the Internet, just as easily as placing a call over the telephone network. Thus, the system is not limited to any particular way of sending a message to, or receiving a message from the system.

Other options for publishing a fax, audio or video message will become apparent to those skilled in the art after practicing the invention and reading this document.

If the user presses the "3" key, this would indicate that the user wishes to enter the user mode. Step 550 detects the "3" key press and directs the caller to the user account menu at step 555. The system then announces the user menu to the caller, prompting them for a selection. The user menu would typically include options to allow the caller to: 1) Receive statistics related to who, how and when a particular users' message was reviewed, 2) Make a payment (if the MPS charges for its services), 3) Change the I&S scheme or passcode for their account, etc. Other user choices can be added and will be apparent to those skilled in the art after reading this document. User menu option number 1 could announce to the user how many times and when a particular message was reviewed. The count could be announced over the phone using pre-recorded speech segments or with the use of TTS (text-to-speech) processing. In addition, the user could request to have the message reviewing statistics faxed or emailed to them. The capability of reporting statistics will probably prove to be very beneficial to users. For example, if many people review a particular message, the user who published the message might consider publishing more similar messages in the future. In addition, it would be preferable to allow the user to reset the review statistics so when a new message is posted (published), the review statistics will correctly relate to the new message and not for the previous message. Another option could allow the user to make a payment for the use of the system by entering their credit card number via touch-tone key presses. Still another option may allow the user to select the Identification and Security means for each type of message they wish to publish. Other announcements, of course, could also be made at this time. For example, there could be an option that would allow the user to select the storage area for each message or part thereof.

Additionally, it would be beneficial for the non-PC user to be able to view one or more published webpages. This could easily be accomplished using the published messages' ID. For example, an additional user option could prompt the user to enter the ID of the message they wish to review. The system could then either fax the one or more webpages associated with that message ID, or could announce the text from the message's webpage(s) to the user via text-to-speech. By allowing the user to review the published webpages, they can fully verify and maintain their own website.

Any DTMF tones entered that are invalid for the requested prompt will result in the system notifying the caller that they are invalid at step 590 and replaying the main menu at step 500. If after a select period of time, preferable ten seconds, no selection has been made, step 510 jumps execution to step 520 which checks so see if the number of main menu replays exceeded a selected count, preferably three. If so, the system will disconnect the call at step 525 and return to waiting for new messages. If not, the main user menu is repeated at step 500.

It is preferable to have several keys be designated to have the same function throughout the interactive voice response system. For example, it is preferred for the "*" (asterisk) key to navigate the user to the previous step or menu, and the "#" to signify that the user has finished responding to the current prompt, such as when the user is done recording an audio message.

Other digits may cause the MPS to take additional actions. For example, the "*" digit is typically used to allow a caller to go back one menu in an IVR system. If the user would press the "*" at the main menu, the system could go back and re-request the caller to identify themselves. This would come in handy if a particular caller has more then one account on the MPS and wishes to publish messages for each account without having to hang-up and recall the MPS. Since the selection of these options with DTMF digits will be apparent to those skilled in the art, the details of this subroutine or subroutines will not be described in further detail.

The system is not limited to the specific interactive voice response system described with reference to FIG. 5. As discussed above, the system may be responsive to one or more DTMF digits other than those mentioned. Further variations or alterations will be apparent to those skilled in the art after reading this document and practicing the invention.

Figure 6:
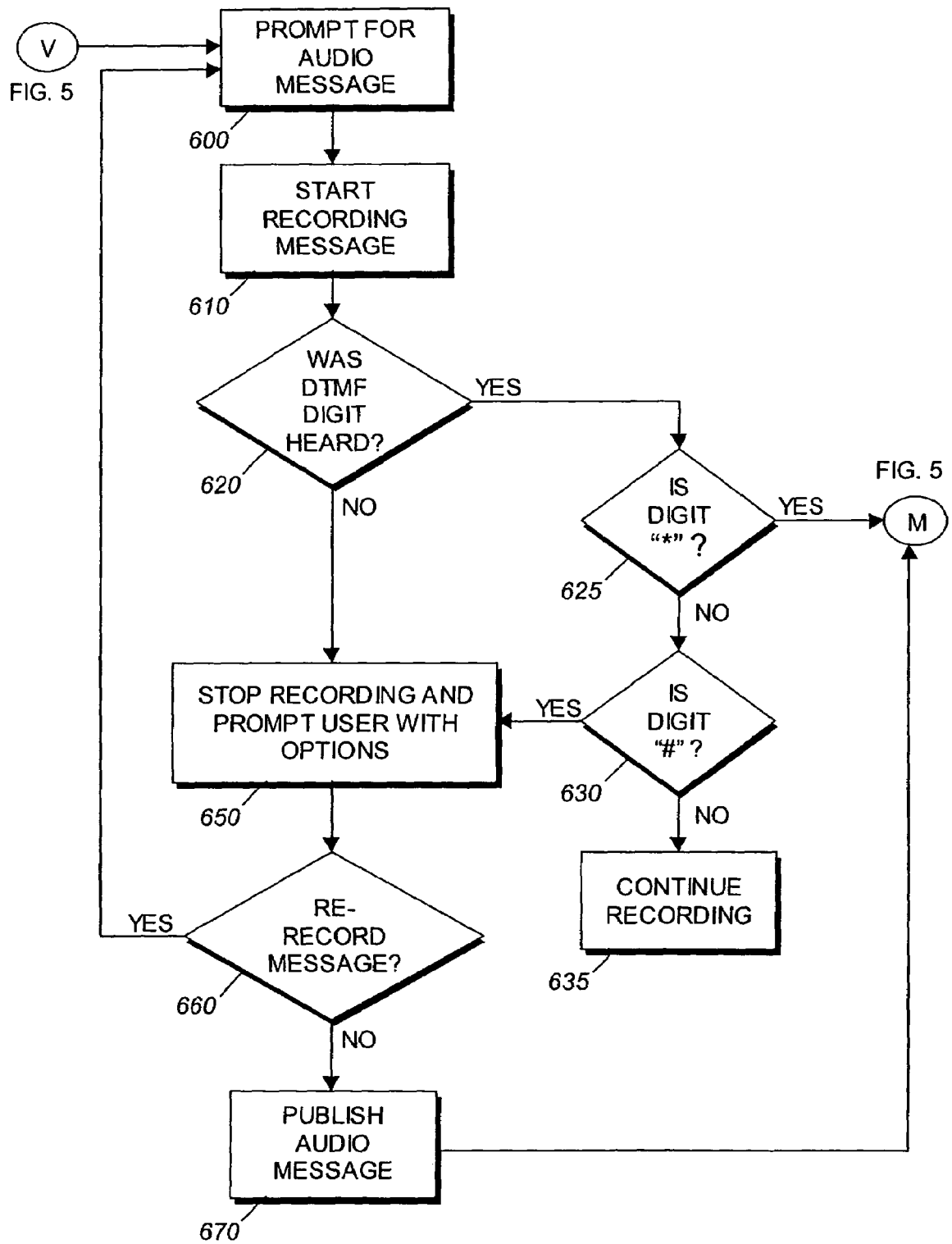
FIG. 6 is a flow chart of operations for receiving an audio message.

With reference to FIG. 6, when the caller wishes to record an audio message, step 600 prompts the user to start their audio message after they hear a recording tone. The system then generates a beep and begins recording the audio message at step 610. The system continues to record the audio signals until; a) the system hears silence for a predetermined period of time, preferably 5 seconds, b) the user presses the "#" or "*" DTMF keys, or c) the specified maximum recording time has been reached, typically 1-5 minutes. Step 620 checks to see if a DTMF tone was heard during the recording. If one was heard, step 625 checks to see if it was the "*" key, indicating that the user wishes to abort the recording and return to the main IVR menu (via circled "M") which was discussed with reference to FIG. 5. If the DTMF key was not the "*" key, step 630 checks to see if it was the "#" key, indicating that the caller is done recording the message. The "#" is commonly used to indicate that the caller has finished entering data in response to an IVR prompt. For example, most credit card IVR systems prompt the caller to enter their account number followed by the pound key. The "#" tells the system that the caller has finished entering the account digits, as an alternative to waiting for the input prompt to timeout. It is considered a "I'm done entering my info, now go act upon it". If the "#" key was detected, or the maximum period of silence has been exceeded, or the maximum recording time has been reached, the system stops recording the message and presents the caller with a menu of options at step 650, such as allowing them to listen to the message to make sure it was recorded as desired, publish the message, or re-recording the message. If the DTMF key was neither the "*" or "#" key, step 635 simply ignores acting upon the key press and continues the recording process. In other words, any DTMF keys that are pressed other then the "*" and "#" will simply be recorded as part of the audio message. This would allow a caller to mix in musical tones, using the other keys of a touch-tone phone, within their audio message. Step 660 checks to see if the user selected the re-record option, and if so, execution is directed back to step 600 and the caller is prompted to record the message again.

Preferably, the system will automatically trim any silence at the start or end of the audio message, as well as any "#" termination tone (if the recording was terminated using it), to create a more professional and efficient message size for storage. After the audio message has been recorded and approved by the caller, step 670 then publishes the audio message, which will be discussed in further detail with reference to FIG. 11, and returns the user back to the main IVR menu (via the circled "M"). As discussed above with reference to FIG. 5, other DTMF digits may cause the MPS to take additional steps. For example, step 650 could include an option to abort the entire audio recording process and return the user to the main IVR menu. In addition, if an invalid digit is pressed, the prompt may be repeated for n attempts before automatically returning the user to the previous menu.

Figure 7:
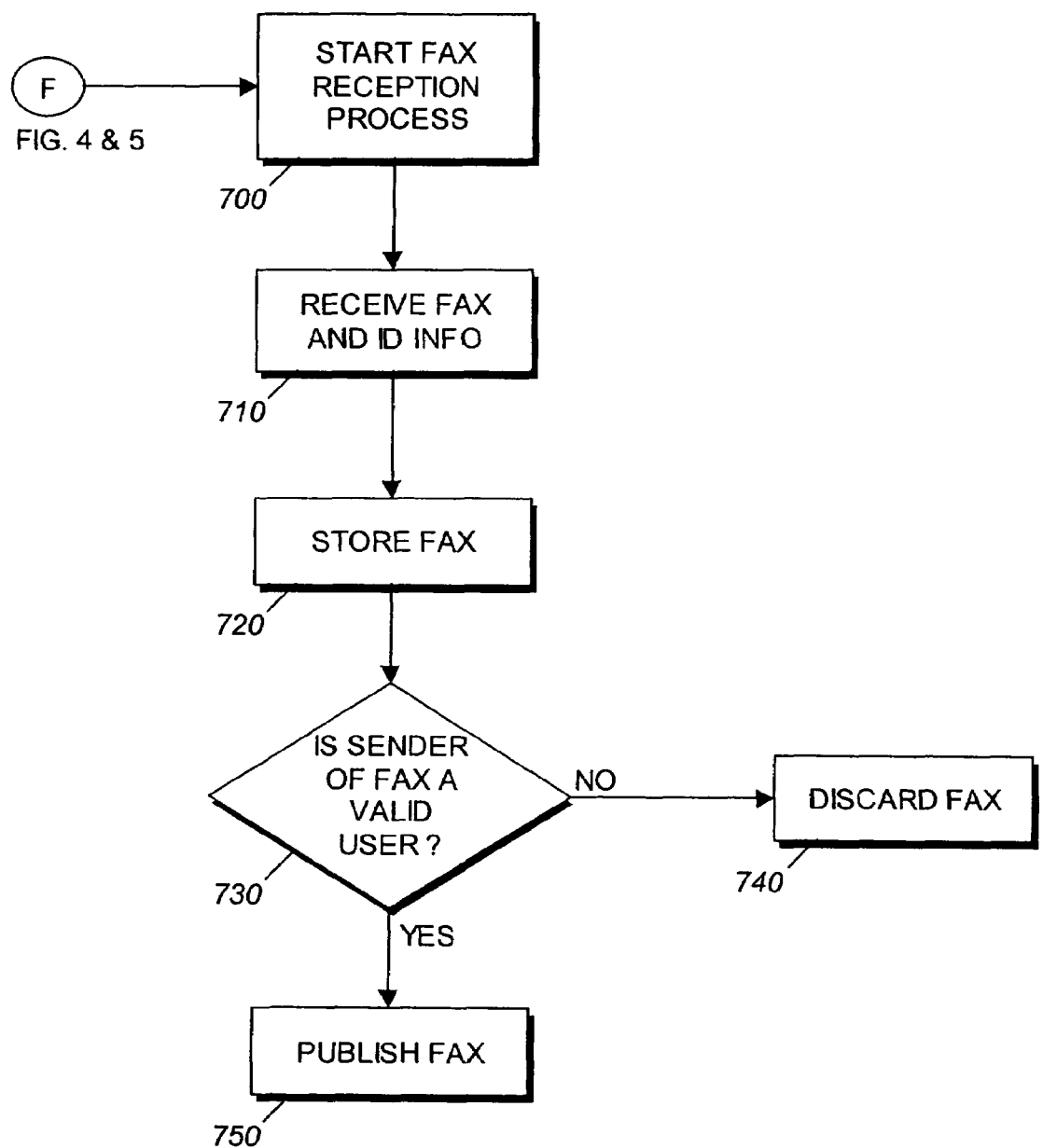
FIG. 7 is a flow chart of operations for receiving a fax message.

With reference to FIG. 7, the MPS initiates the fax receival process at step 700, which comprises the use of hardware and/or software to receive the fax message from the user. A hardware fax device is typically used when a fax is being received over a telephone line. Software protocols such as IP-Faxing allow a fax to be received over a data network without requiring special fax hardware. Step 710 receives the fax and any associated or accompanying ID info. Common ID info was discussed in detail with reference to FIG. 2. If the fax arrived over a telephone line, the call is typically terminated after the fax is received. Step 720 then saves the faxed document into a storage area, such as the user's storage area. Step 730 then attempts to use all of the available ID info for the fax message to identify the sender of the fax as an authorized user of the system. If the system can not identify the sender of the fax to be an authorized user, the fax is discarded at step 740 and the system returns to waiting for a new message. If the sender of the fax has been identified as an authorized user of the system, the fax is published at step 750, which will be discussed in detail with reference to FIG. 8.

The preferred method for processing and publishing an email message will be discussed later with reference to FIG. 12.

In the preferred embodiment, the message is converted and presented for review on one or more webpages. Webpages typically contain hypertext Markup Language (HTML) code, which is the current defacto standard used to create webpages on the Internet World Wide Web. Other markup languages exist such as XML (eXtensible markup language), RPC (Remote Procedure Call) and DHTML (Dynamic HTML) that are also used for creating webpages. The system is not limited to any particular method used to create webpages, any language or method that can present the message on the Internet for review by a requestor can be used.

When the message comprises an XML file, it presents particular advantages. XML has become a popular format to store and transfer data. One particular application that utilizes XML is RSS, or "Real Simple Syndication". Many websites now include an RSS "feed", which is essentially an XML formatted document typically containing news or information tid-bits related to that website. XML documents often contain human readable phrases and text, but they are typically formatted to be efficiently parsed by software applications, so they are typically not viewed by human eyes.

When publishing a message, the system can embed the message within an existing XML document or by generating a new XML document to host the message. Once the message has been transformed into an XML format, RSS readers can then be used to download the published message. RSS readers are typically software applications that download RSS feeds from one or more websites and present the information contained in the XML files in a human readable format to the RSS user. RSS readers are just one application that utilizes RSS or XML files. Once information or data is stored in the computer-friendly XML format, it can be sorted, compiled, index, etc., by a wide range of automated and non-automated software programs.

Other advantages of publishing a message in XML format will become apparent to those skilled in the art upon reading this disclosure.

Typically, a potential reviewer of the message will use a web browser type software program or device to view the webpages containing the published message. Webpages typically contain a number of references within it. References are typically an "inline" type or "link" type. Inline references are typically used to display the actual image or other data within the webpage itself when the webpage is displayed to the reviewer. For example, if an inline reference is made to an audio file, the audio file will automatically start playing to the reviewer of the webpage when the webpage is displayed. The reviewer does not have to select the link to start playback.

Link type references (a.k.a. an anchor or hyperlink) allow the reviewer to access information or data contained in another file when the reviewer selects the reference. A reference can be both inline and a hyperlink. For example, a webpage could contain an inline reference that displays a reduced size image of a fax page. And by having the reduce-sized image also be a hyperlink to a full size image of the fax, the reviewer could view the full size image by simply clicking on the reduced size image.

Each message, or part of a message (i.e. a page from a multi-page fax message), can be presented to a reviewer in various ways. For example, a fax page image (or an image file attached to an email message) may be enlarged and/or reduced to accommodate the reviewers' viewing preferences. In this example, the system could generate small, medium and large size images of the message. The system would then create webpages to host each size image and embed each webpage with references to the other size webpages. Using this method, the user or reviewer could configure the system to first show the medium size image when it is requested. The requestor could then select the smaller or larger link from the medium-size webpage if they desire to see the message in a smaller or larger view respectively. There are many reasons for generating reduce sized images of a fax. For one, a smaller image file not only requires less storage space, but it will take less time to transfer a small image as opposed to a full-size image. In addition, a reduced size image may help facilitate the viewing of an image in a smaller window of a web browser by minimize the amount the requestor is required to scroll the message horizontally and/or vertically to view the entire image. Thus, smaller images may give a reviewer the jest of the message without requiring the reviewer to download the bigger full-size image of a message. A full-size view permits the reviewer to clearly discern any comments or details that may be placed in the message, which may not be possible from just a reduced image of the message.

The webpages that host a message could be blank except for the message, or preferably, the webpage would contain other information related to the message or user. For example, when the system generates a webpage for a message, it could automatically insert some of the users account information such as their company name, address, telephone number, etc. into the webpage along with the message. This would eliminate the need for the user to manually include this information in each message they publish. In addition, the system could insert the date and time that the message was published to let reviewers ascertain if this is a new message or an old one.

Alternatively, in addition to (or instead of) displaying a message's graphic image on a webpage, the image could be processed by Optical Character Recognition (OCR) software to convert the text contain within an image into computer readable ASCII data. Similarly, a voice message could be processed by speech recognition (SR) software to convert the voice message into ASCII text. The resulting ASCII text could be placed within the same webpage as the voice or image message or in a separate webpage. Having the extracted ASCII text on a webpage can be very beneficial. For example, it can allow a visually impaired person to review a natively non-text message using a TTS (text-to-speech) screen reader program that reads aloud the extracted ASCII text. Preferably, the webpage containing the extracted ASCII text could be automatically submitted by the system to one or more Internet search engines so when a potential reviewer performs a search for a keyword contained within a users message, the corresponding user's webpage will be included in the search engines' "hit" list. When the reviewer selects the link on the hit list that corresponds to the users webpage, the users webpage will then be presented to the reviewer. If the ASCII text is placed in a separate webpage, it is preferably for the ASCII webpage to have a link to the original voice or image message webpage, so the reviewer can review the message in its original form, thereby eliminating any possible errors in the SP or OCR conversion process. The link to the original page could consist of program code to automatically display the original webpage when the ASCII webpage is requested.

An example of some Java code that can do this is listed below: (where F1P1.htmp is the original webpage)

```
<script language="JavaScript">
bName = navigator.appName;
if (bName == "Netscape" )
window.location="http://F1P1.html";
else
window.location="http://F1P1.html"
</script>
```

By allowing the reviewer to review the original image of a message, the system offers the advantage of allowing the reviewer to see items such as hand written text and/or illustrations that OCR software typically has a hard time converting accurately.

In yet another method, the generated ASCII text could be hidden within the graphic image webpage using various methods such as using a very small font size, or having the same foreground and background font color, or embedding the text within a meta tag. These methods will typically allow the hidden ASCII text to be indexed by a search engine but be invisible to a reviewer when the webpage is displayed. The ASCII text from an image or audio message does not have to be placed on a webpage. For example, the generated ASCII words could be indexed and placed into a database. A reviewer could then query the database and find a particular message by searching for keywords that are contained in the message.

When more then one message (or pages of a fax message) exist for a user, the system preferably generates and maintains one or more table-of-contents (TOC) webpages. These webpages would typically contain links to all the messages (and pages) associated with a particular user, group of users or even a particular storage area. Each item in the list would contain a reference to its respective message. A reviewer could either access a message directly if they know the direct message address, or they can view a TOC webpage to find the message they are interested in, select the link, and be presented the message they chose.

The system may not need to create a webpage each time a message is published. For example, a webpage may be created once that includes a reference to the image filename of "1.GIF". Then, when each time a new single-page fax message is received, the system could simply convent the fax page into a standard GIF image with the filename "1.GIF" and store the image file into the users storage location that is addressable by the already existing webpage, thus replacing/updating the previous fax page. When a reviewer requests the webpage, the webpages's reference to "1.GIF" will cause it to be displayed to the reviewer. As you can see, the system may only need to update the image file "1.GIF" to publish a replacement fax message. Using this method, a user could maintain (update/edit) the static portions of their webpages independently from the system. The system would then allow non-technical users to update the webpage's main content with the ease of use that the system provides. Suffice to say, even if the system doesn't create a new webpage for a new message (such as in the case when an existing webpage can be used to host the new message), the message was still converted from a non-webpage reviewable (or retrievable) format into a webpage reviewable/retrievable format.

A users webpage could consist of many parts, where each part can be updated separately by the system depending on the destination and ID of the users message. For example, a user could publish a price list webpage complete with a "today's special" at the top of the page. Then, by having each part (the price list and the daily special sections) addressable separately, the user could update the special without disturbing the price list. For this example, the special section of the webpage could reference the fax image file "1.gif" and the price list could reference "2.gif". So, when the user publishes a new 'special' message, they would simply tell the system to update item #1.

The various ways that the system could publish and present messages to reviewers may be specified by the user or the reviewer. For example, the user and each reviewer's' preferences may be stored in the users' storage area. Alternatively, the system could use cookies (a type of preference/data file that is created and saved on a reviewers' computer) to save a particular reviewers preferences, such as the preferred image size for viewing a fax page. With this method, each time a reviewer requests to review a message, the system may use the data contained in their cookie file to display the message in the size and/or style they prefer. These preferences could also indicate the default method to present the messages or what messages should be included in the table-of-contents (described below) webpages. For example, if a particular reviewer does not have a means to play an audio message, the system could be configured to omit all audio messages from the TOC webpage. Other options are also available so that the user or reviewer can custom fit the MPS to their own personal preferences or the reviewers' own computer. Alternatively, it may be beneficial to allow certain reviewers preferences to override certain user preferences so as to allow the reviewer to review the messages in a manner that is preferable to the reviewer.

After a message is received by the system, it is typically converted into a format compatible to the way it will be reviewed. Since the preferred embodiment of the system is to allow the message to be reviewed on the Internet World Wide Web, the preferred conversion method converts the message into a one or more webpages. Each message type (sound, image, text, etc.) has its own preferred conversion method and file format. Converting the message into a common format ensures that the message can be reviewed by a wide range of programs and devices. For example, it is preferred to convert each page of a fax message into a GIF compatible image file. The GIF image file format is preferred because most web browsers can display this image format natively, without requiring any additional software to perform this function. However, as new image formats such as JPEG 2000, PNG and SVG become popular and supported, another file format may be the preferred file format in the future. The system is not limited to any one particular file format. Since most computers are capable of playing WAV files, the preferred file format for audio messages is the WAV file format. Another popular audio format is a streaming audio type format, such as Real Audio™. Streaming audio formats have the benefit of allowing a reviewer to start hearing the audio message almost immediately after it has been requested. With WAV files, the requestor must wait for the entire audio file to download to the requestors' computer before they can play the file. The details for these and other conversions will be discussed next. After the message is converted into a common file format, one or more webpages are created to 'host' the converted file format (s) so that the message's file(s) can be presented to the reviewer when they request the message's webpages.

Figure 8:
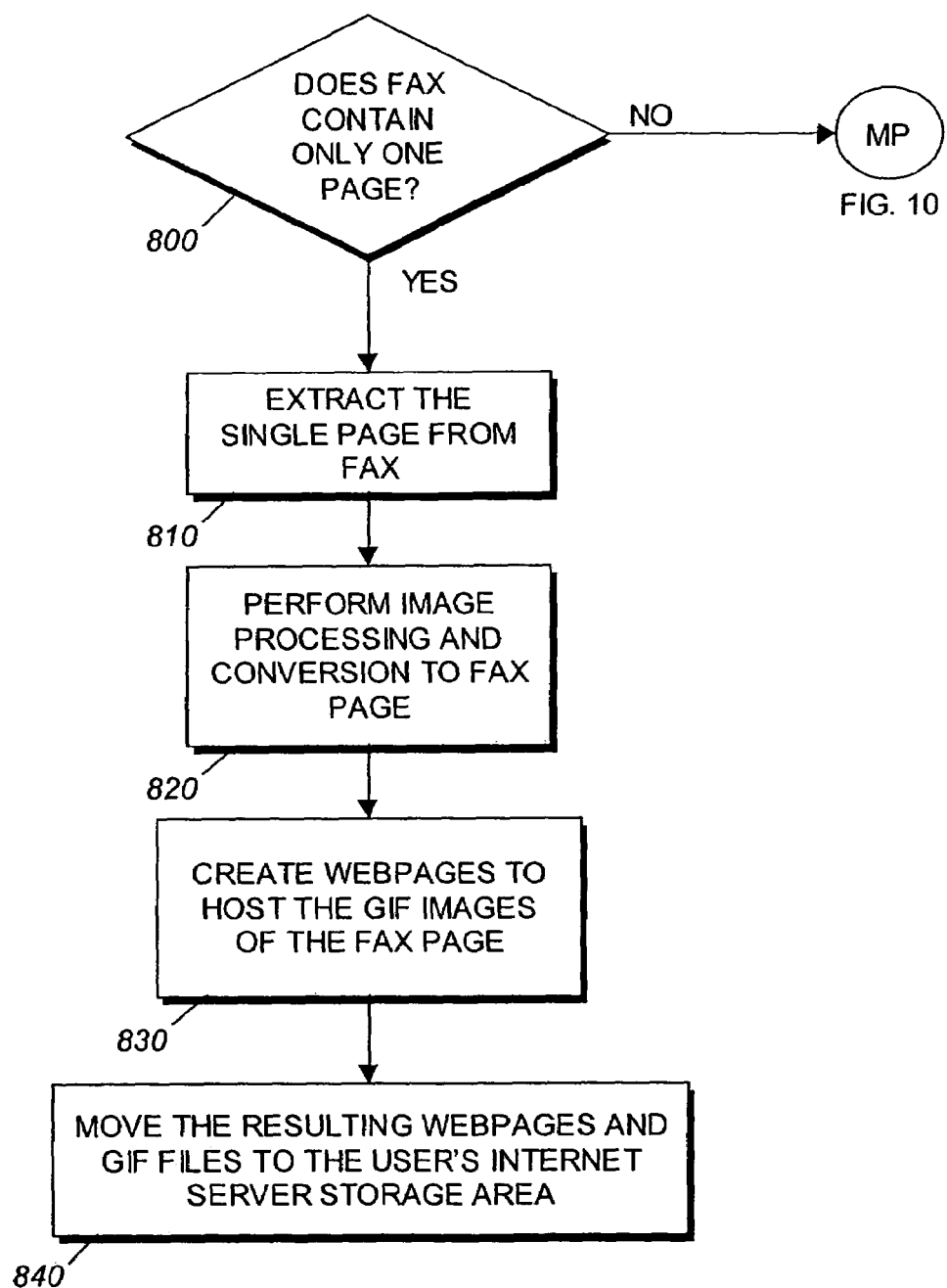
FIG. 8 is a flow chart of operations for publishing a single page fax.

With reference to FIG. 8, when a fax message has been received, step 800 determines if more then one page exists in the fax message. If more then one page exists, the conversion process proceeds through point MP to step 900 and will be discussed in further detail with reference to FIG. 9. If the fax message contains only one page, it is extracted from the fax message at step 810 by using software such as FaxPlus™ by Elltech Development. The FaxPlus software development kit (SDK) supports the extraction of one or more fax pages from a fax message into one or more graphic image formats. Image conversion routines, such as provided by Lead Technologies, may be used to convert a non-GIF file format to the preferred GIF file format if a particular fax SDK does not support the GIF file format. Once the single page is extracted into an image format, it preferably undergoes one or more image processing procedures to enhance and/or enable it to be published.

One such image processing procedure is to straighten up the fax page. Typically, when a fax is manually sent, it may be tilted to the left or right in some manner. While the fax may still be legible, it may be undesirable or appear unprofessional to some reviewers. To correct this, special image processing can be performed such as 'auto deskew', a routine provided by LeadTools' Imaging SDK, that will automatically analyze an image and straighten it up. Additionally, faxes commonly have 'speckles' or undesired dots within them. Other image processing can be performed to remove or reduce these unwanted artifacts. In addition, an image process called trimming can be performed to a fax page to remove one or more sections from the page, such as the top header usually present on each page of a fax. The fax header typically includes the sender's name, telephone number, the date and time the fax was sent, along with a page number. While this information may be helpful to most regular fax recipients, it may be undesirable or unprofessional for a reviewer to see such information.

Preferable, a fax message would also undergo image processing to convert it from a normally two-tone black and white image into an image with a varying gray scale. As is known in the art, a gray scale image of a facsimile page provides a better image than simply a black or white image of a fax page. The image processing may comprise any suitable standard contrast curve method of processing, such as anti-aliasing or a smoothing filter. The image processing may occur concurrently with the conversion process and is preferably performed for both full and reduced size images of the facsimile. In another example, a color fax may be converted to a gray-scale fax to conserve storage space and reduce the time required to transfer the image to the requestor.

Additionally, each page image of a fax could be processed by OCR (optical character recognition) to extract ASCII text data from the image of the page. The extracted text may then be used to create a text-only version of the fax message and/or the extracted text could be stored in database that would allow the fax message to be found by searching the database for particular keywords or phrases contained in the fax. In another example, software such as Caere's OmniPage Pro 9.0 can not only convert graphic text to ASCII text, but it can automatically distinguish between the text and graphics portions of a message and produce a rich-text-formatted (RTF) document that preserves the layout and appearance of the original page. The resulting RTF document can then be converted into a webpage using. Using this method, a graphic fax page (or any message containing an image of text in it) can be completely converted into a searchable webpage with the text and graphic images positioned virtually identical to the way they were in the original fax image.

The exact image processes used by the system are not limited to the described methods or software described. For example, an additional process could convert the normally black and white color of a fax message into other colors such as a company's logo colors as per the user's preferences. Other image processing and routines will become apparent to those skilled in the art when practicing the invention.

Once the fax page has been extracted, processed and preferably converted into a GIF image file, a webpage is typically used to 'host' the image by including an anchor or reference to the image file so it is displayed when the reviewer requests the webpage. FIG. 9 provides an example of a webpage displaying a reduced-size GIF image of a sample deli menu. Typically, the main portion of the webpage will contain the published message. As is illustrated, the heading and footer of the webpage can provide information about or related to the user or the message, such as the users business name and contact info. In this example, the bottom of the webpage includes an anchor or link to "Zoom In", allowing the reviewer to view the full-size image of the fax page when they select the link. In addition, information such as when the message was updated, page number, advertisements and a link to a company providing the services of the MPS can also be included on the webpage. Many other items can be placed on the webpage and will become apparent while practicing the invention and reviewing other webpages on the Internet.

For the example in FIG. 9, the single fax page was converted into two separate GIF files, "F1P1-R.GIF" and "F1P1-F.GIF". These files were named in a manner that provides information about them. For example, the "F1" part of the filename indicates that it is from "Fax Message #1", The "P1" indicates that the file is Page 1 of the fax message, the "-R" and "-F" indicate the reduced and full-size images (respectfully) of the fax page. Typically, two webpages are used to display these images, one to display the full size image and the other to display the reduced size image. In this example, the webpages files are named "F1P1-F.HTML" and "F1P1-R.HTML" using the same naming convention as previous discussed with reference to the fax images. Each of these webpages include a reference to the other so the reviewer can switch between them by selecting the 'zoom in' or 'zoom out' references respectfully.

An example of the "F1P1-R.HTML" file for generating the sample webpage shown in FIG. 9 is shown in Table 1 below.

TABLE 1

```
<html>
<head>
<title>USERNAME</title>
</head>
<body>
<p align="center"><big><strong><big>USERNAME</big></strong>
</big></p>
<p align="center">   USERADDRESS<br>
USERPHONE</p>
<p align="center">LASTUPDATED</p>
<hr>
```

TABLE 1-continued

```
<p align="center"><img src="F1P1-R.gif" width="580" <br> <br>
<a href="F1P1-F.HTML">ZOOM IN</a></p>
<hr>
<p align="center"><a href="http://www.easywebs.com">Click here</a>
to find out how your fax machine can create webpages</p>
<p align="center"><small>©1998-99 EasyWEBS</small></p>
</body>
</html>
```

As illustrated in Table 1, the image file "f1p1-r.gif" for the reduced-size image is embedded into the HTML file. Also indicated is that the anchor for "ZOOM IN" directs the MPS to the "F1P1-F.HTML" webpage which contains the full-size image of the fax page and the anchor for "Click here" directs the reviewer to the homepage of the website providing the MPS service.

In the example shown, the first HTML file has an anchor for "ZOOM IN." This anchor is defined as a=<A HREF="F1P1-F.html">ZOOM IN"</a>and will therefore reference the second HTML file 'F1P1-F.HTML' when the reviewer selects the "ZOOM IN" reference. The second HTML file "F1P1-R.HTML" would have an anchor b for the "ZOOM OUT" and defined as b=<A HREF="F1P1-F.html">ZOOM OUT"</b> so it would direct the reviewer back to the reduced sized webpage. Additionally, the 'zoom in' and 'zoom out' references could be attached directly to the images themselves, allowing the reviewer to simply click on the image to see the full or reduced size image respectively. Example HTML code for attaching the full-size webpage link to the reduced-size image would be <a href="F1P1-F.HTML"><img src="F1P1-R.GIF" width="580"<br></a>.

The system is not limited to any particular file naming method. For example, a deli owner may wish to have the first page of each fax message he published to be named "breakfast.htm" and the second page named "lunch.html". The names for the files could be dictated by pre-defined user preferences or by the user at the time they are publishing the message. Technologies such as OCR and SR can be used to convert the users' fax and voice (respectively) information into ASCII text that can be used to name each file.

Alternatively, the name for a file could be specified by the contents of the message itself. For example, if the first line of text in a fax message is "Today's Specials", OCR could be used to extract the title text from the page and save the fax message as "todays_specials.html". The text used to name the file does not have to be at the top of the page. The user could specify any location on the page to use as the filename, such as the footer or the largest size text present on a page could also be used. In another example, the user could dictate the desired filenames via commands such as "filename=lunch.html", in a email message that they are publishing.

When the system needs to create one or more webpages for a message, it could use a pre-defined set of instructions for creating the webpage(s), or it can preferably create the webpage(s) based on the users or reviewers preferences. For example, the system could use a template webpage as a basis for creating a messages' webpage. In this example, when a message is being published, the system could make a copy of the template webpage, insert the new message into the copy and publish the copy. By using a template webpage, the appearance of many messages can be made consistent by basing them on the same template webpage. This allows the appearance of many messages to be easily changed by simply editing the master template webpage. The system could be configured to use a single template for every user, or a different template for each user, or a different template for each message, or any number of other combinations. In addition, the templates could have keywords embedded within them that could signal the system to substitute the keywords with other information. For instance, in Table 1 the word "USERNAME" is contained in the title of the example HTML document. The system could then scan a messages' webpage for this keyword. When the system comes across this keyword, it would simply substitute it with the user's account name. This way, the resulting webpage will contain the actual user's name of "Joe's Deli" (as in FIG. 9) instead of the text "USERNAME". Other methods for having the system automatically insert information when the webpage is being generated, such as inserting the date the webpage was created, will become apparent to those skilled in the art after practicing this invention.

In addition, the message, or a portion of the message, could be used to substitute a keyword. This would have the advantage of allowing the user to create or supply their own webpage (or template) and place a keyword or "tag" set within it such as <message></message> at the location that they wish to have the published message inserted. Thus, the user would be able to customize their own webpage and easily have full control of where the published message will be embedded within it.

In addition, multiple keywords or tags can be used within a single webpage to allow different messages (or different portions of a single message) to be embedded in different locations within the webpage.

Each webpage preferably contains anchors in addition to those relating to "ZOOM IN" and "Click Here." For instance, as mentioned previously with reference to email list servers, a webpage would preferably include a link to a message notification webpage that would allow a reviewer to enter their email address so, when a particular message is updated, they will be notified via email. Other anchors, such as an anchor to the user's main Table-of-Contents webpage, so a reviewer can be presented with a list of all the user's messages that are available for review, will be apparent to those skilled in the art and may also be provided.

After the full and reduced-size images and webpages for the fax page have been created, they are moved to the users' Internet storage area at step 840. After this step has been performed, the fax message is available for review.

Figure 10:
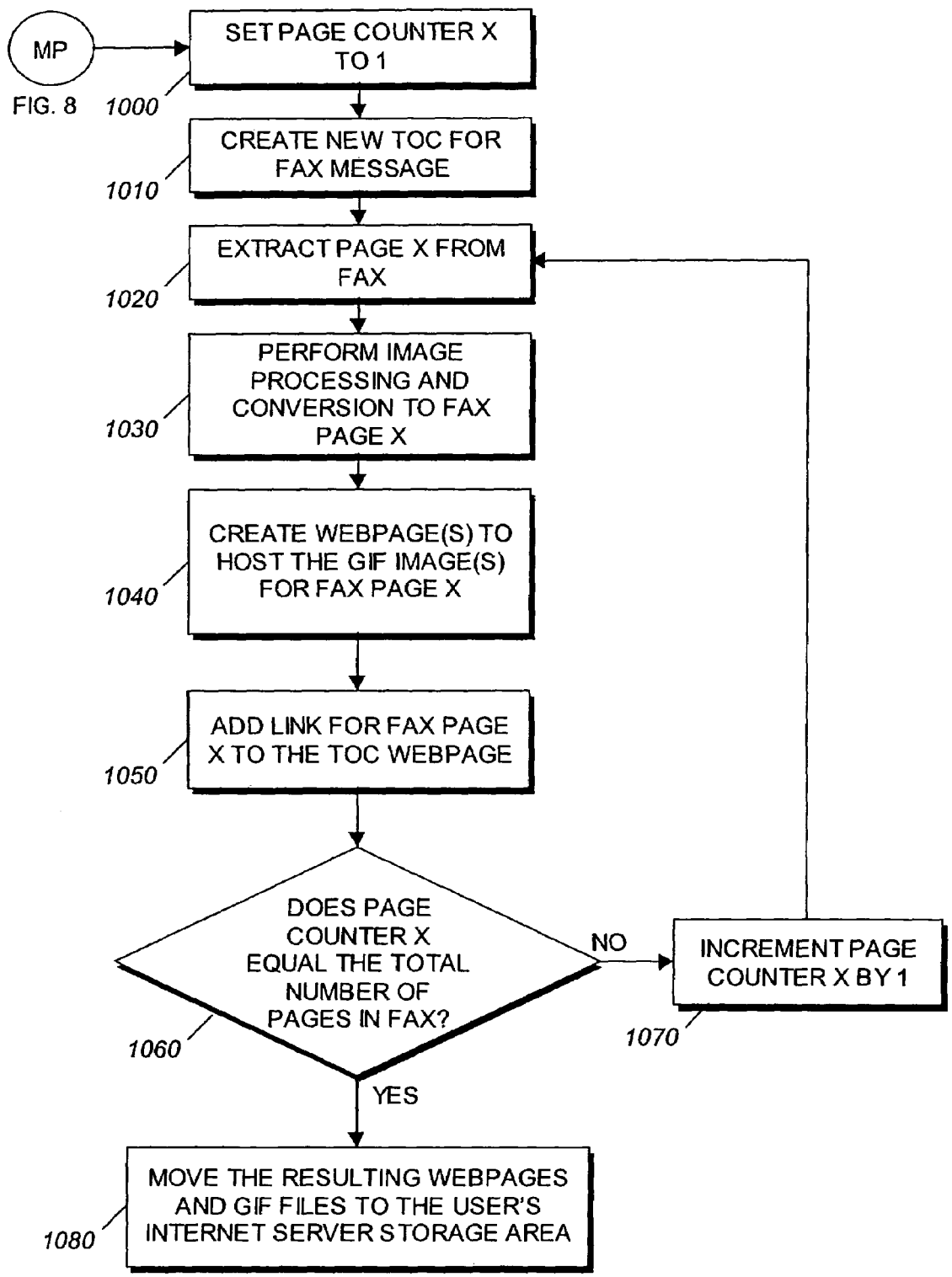
FIG. 10 is a flow chart of operations for publishing a multi-page fax.

Reference to FIG. 10 will now be made when more then one page exists in a fax message. When it is determined that more then one page exists in a fax message, step 1000 sets a software page counter variable X to "1". Step 1010 creates a new table-of-contents webpage for the new multi-page fax message. Step 1020 extracts the page contained in the software page counter variable from the fax message. This step is very similar in operation to step 810 in FIG. 8 with the exception that it uses a variable software page counter instead of a fixed "1" for the page number to extract. Steps 1030 and 1040 are similar in operation to steps 820 and 830 in FIG. 8, with the same exception that they use a variable software page counter to dictate what page number is being processed and in naming the resulting webpage and image filenames. Step 1050 adds a link for the current fax page X to the fax messages' TOC webpage. This link is added to any existing links that may already exist in the fax message's TOC file so, for example, if a fax message has 5 pages, then 5 links will be added to the fax's TOC page, one for each page. This allows a reviewer to not only see how many pages a fax message has, but they can jump directly to any page of the fax message from the fax's TOC page by simply selecting its respective link. Preferable, step 1040 would also add links such as "TOC", "NEXT" and "PREVIOUS" to each of the fax's' webpages so the reviewer can easily navigate through the pages of the fax message. After the full and reduced-size GIF images and the associated webpages have been created for fax page X, step 1060 checks to see if the software page counter equals the total number of pages in the fax. If the software page counter variable does equal the total number of pages in the fax, then all of the pages for the fax message have been processed and execution proceeds to step 1080. If the current software page counter variable does not equal the total number of pages in the fax message, the software page counter X is incremented by one at step 1070 and execution is looped-back to step 1020. Previously discussed steps 1020-1050 then process the next page of the fax message and so on. Thus, each page of the facsimile message is converted into one or more webpages. When it has been determined at step 1060 that all pages of the fax message have been processed, the resulting files (gifs, full, reduced and Toc webpages) are then moved to the users' storage area at step 1080, thus making the fax message available for review.

The system does not have to create a separate webpage for each page of a fax message. Each fax page image can be placed within the same webpage to make navigating through the fax message easier.

As mentioned previously, the user's main TOC webpage will typically contain (among other things) a list all of the messages that exist for the user. Typically, the main TOC webpage might be named "index.html" so it will be the default webpage displayed when a reviewer visits the user's website. For example, if a reviewer does not specify a particular webpage, such as by simply typing wwwjoesdeli.com, the web server will typically default to presenting the reviewing with the webpage named "index.html". Using this method, the reviewer can easily be presented with a list of available messages on their website. The TOC may group the messages by type (i.e. faxes, email, audio, etc.), sort by the date the message was published, or any number of other arrangements that can be specified by the user or reviewer. In addition, the user may wish to not include certain messages in one or more TOC webpages, such as private messages that are protected by a password and meant to be viewed by certain reviewer's only. Other sorting and display methods will become apparent after practicing the invention.

When a message is received and published by the MPS, the MPS may update one or more of the users TOC webpages to include a link to the newly published message according to the users or reviewers preferences. The MPS may create different TOC webpages for each reviewer according to their preferences. For example, one reviewer may wish to only see a list of the available fax messages and no email or audio messages. Additionally, the system may include a preview of one or more messages, such as a reduced-sized image of a fax message, within the TOC webpage itself. This would allow a reviewer to preview a message without requesting it directly. In addition, the first sentence or a five-second clip of an audio message may be used to preview email and audio messages respectively.

When the reviewer selects one of the messages on a TOC list, the selected message is transmitted to the reviewer's computer 140 through the Internet 130. The reviewer may also scroll through the TOC listings if all of the messages cannot be displayed at one time on the reviewer's computer. A TOC webpage can contain a link to another TOC webpage, such as the main TOC containing a link to a TOC for a multi-page fax message. Alternatively, the main TOC may contain direct references to each page of a multi-page fax message, allowing a reviewer to review a page directly from the main TOC webpage. Preferably, when a message contains multiple sub-messages, such as with a multiple-page fax or multiple email attachments, the MPS will create a TOC webpage for that message, listing the sub-messages contained in it.

The name for entries contained in the TOC are not limited to simple descriptions such as "Page 1", "Audio Message #2", etc. For example, if an email message had a file attachment named "setup.exe", the System could add an entry and reference of "setup.exe" to the TOC for a file. Using this method, the system could automatically create the TOC link names based upon the actual name of the published message or attached files. A still further option might allow the user to speak the title of the message they are publishing. With this option, the MPS could convert the spoken title into ASCII text using speech recognition (SR) and add the ASCII title to the TOC webpage. Alternatively, OCR processing could convert a section of a fax message, such as the first sentence, into ASCII text and use the ASCII text to name the message.

The TOC webpages would preferably contain other information for each message, such as the date and time each message was published. Other information, such as the number of pages contained in a fax message, may also be provided and will be apparent to those skilled in the art.

Figure 11:
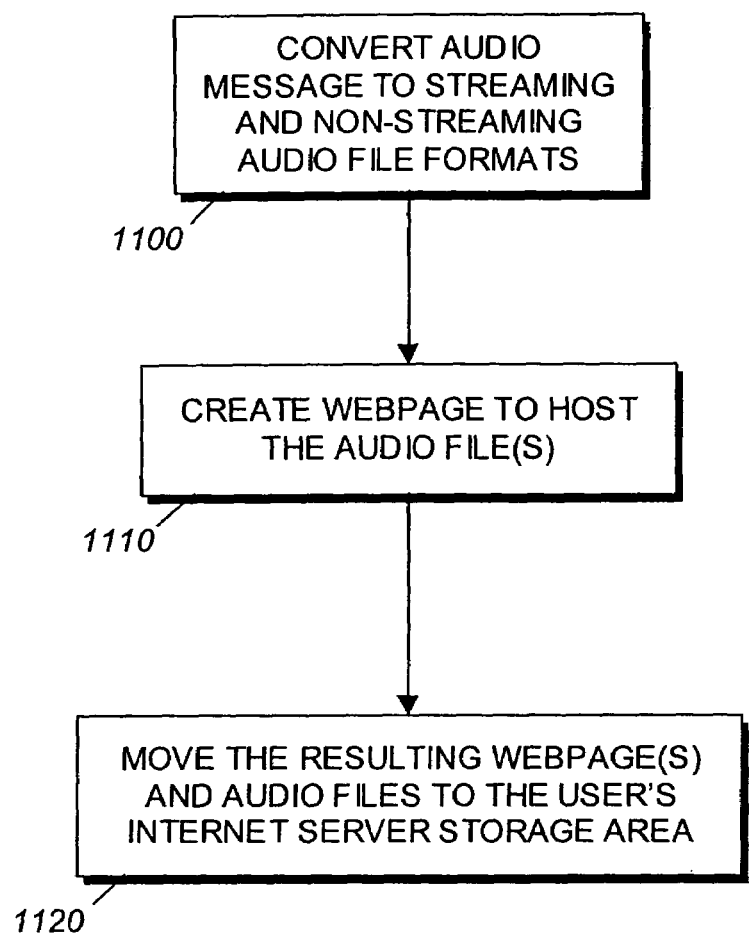
FIG. 11 is a flow chart of operations for publishing an audio message.

Reference to FIG. 11 will now be made when publishing an audio message. There are currently two commonly used methods to send audio messages over the Internet, the downloadable type and the streaming type. Streaming type audio formats such as RealAudio™ allow the requestor to begin hearing the audio message almost immediately after they request it. WAV type audio files require the entire audio file to be first downloaded to the requesters' computer before they can start playing the audio message. The desired audio format may be specified by the user or the requestor as per their preferences. When an audio or voice message has been received by the MPS, it is typically recorded to, or already in an audio file format. Various programming tools, such as Artisoft'S™ Visual Voice Tools, can convert an audio message from one format to another. Step 1100 converts the audio to the desired format. Once the audio message has been converted to the desired audio format, step 1110 would create a webpage to host the audio message similar to the methods described previously with reference to publishing fax messages, but instead of creating image files, a reference to the resulting audio file(s) are placed within the message's webpage. Additionally, the system may generate both streaming and non-streaming audio files and include both references in the message's webpage. This would allow a reviewer to select the audio format of their choice.

Preferably, an audio message would undergo processing to remove undesired artifacts from the message. One such processing could remove extended periods of silence, especially at the beginning and ending of the message to reduce it's storage requirements and transfer time. In addition, the volume of the audio message could be raised or lowered to result in an optimal volume for requestors to listen to it.

An entry for the audio message would typically be added to the users' TOC webpage. Additionally, the TOC and/or audio webpage may have additional anchors or references. For instance, each audio message may have an anchor directing the MPS to a file that contains a short sampling of the message. Thus, when the reviewer selects this anchor, the reviewer could receive the first 5 seconds of the message or some other predefined number of seconds. After the audio file(s) and host webpage have been created, they are moved to the users' storage area at step 1120, making it available for review.

Figure 12:
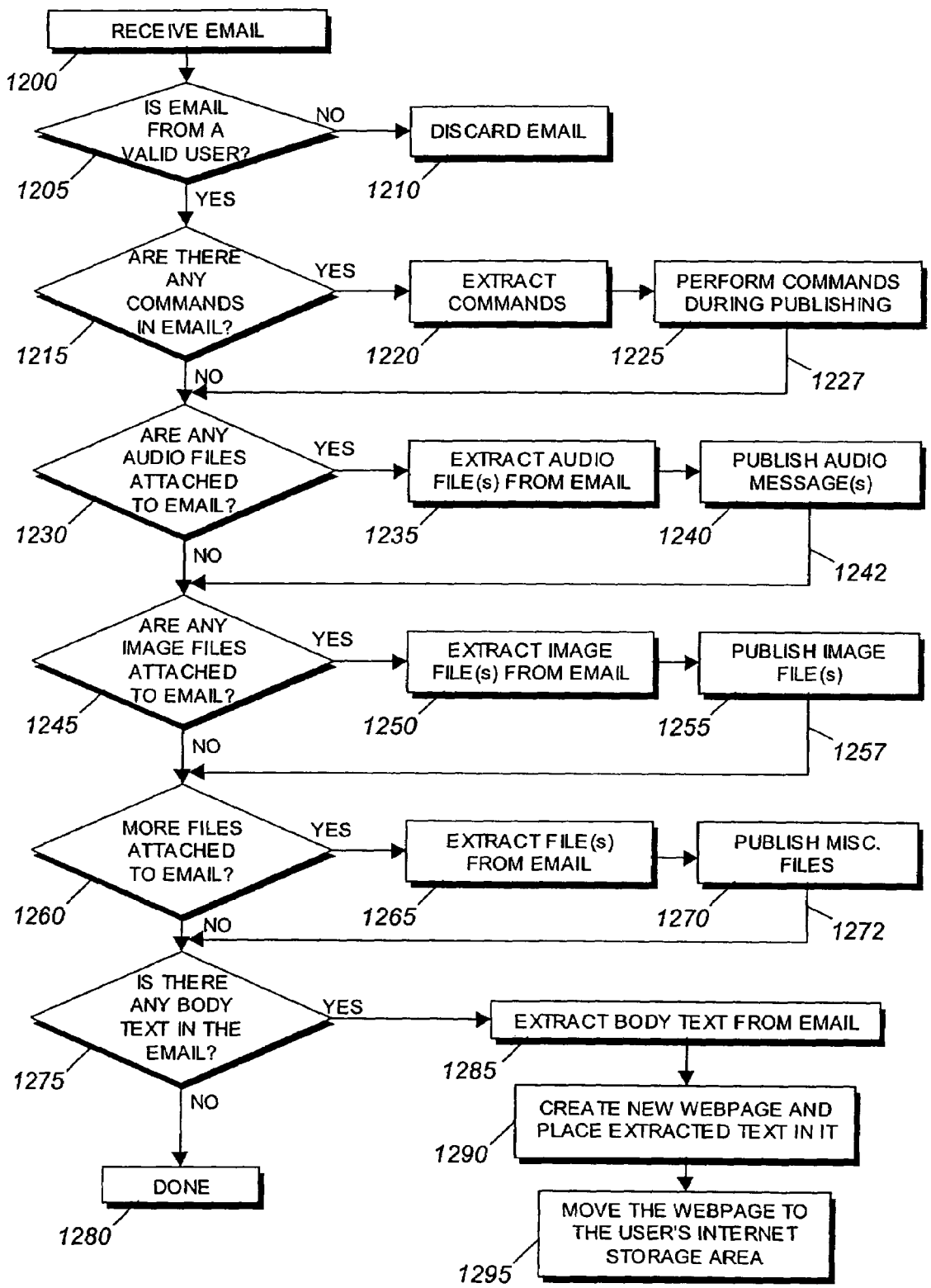
FIG. 12 is a flow chart of operations for publishing an email message.

A process for publishing an email message is illustrated in FIG. 12. The system receives the email message at step 1200. Typically, an email message contains information indicating who the email is from, who the intended recipient is, the subject of the email and the body or contents of the email. In addition, one or more files may be attached to the email. These attached files can contain images, sounds or any other type of data. Step 1205 uses all the available information associated with or accompanying the email message to determine the identify of the sender, and if they are an authorized user of the system. Information such as that contained in the "From", "To", and "Subject" fields could be used to determine if the sender is an authorized user. To verify the senders' identity, a password or other verification information could be placed within these fields, the body of the email or in an attachment. For maximum security, digital Signatures and encryption could be used. Digital signatures are increasingly being supported in various email programs such as Microsoft's Outlook Express, that allow a recipient to positively know who a particular email message was sent from. In addition, encryption can be used so only the indented recipient can read the email message. The actual contents of the email, or any of its attachments, can also be used to identify the sender as an authorized user. For example, if a particular email has an attached image file named "10023.JPG", the 10023 could correspond to the account number of the user. Other methods to identify the sender as an authorized user of the MPS will become apparent to those skilled in the art after practicing the invention. Regardless of the method used, if the system can not identify the sender as an authorized user of the system, the email message is discarded at step 1210.

If the sender of the email has been identified as an authorized user of the system, the system checks at step 1215 if there are any commands contained in the email. If there are, they are extracted at step 1220 and saved at step 1225 for use during the processing and publishing of the email. Typical commands such as "MESSAGE=NEW" could be placed in the 'subject' field of the email to indicate that the email should be added to any existing user messages and to not replace any. After the command(s) have been extracted from the email, execution is directed to step 1230 via execution return path 1227. Execution return paths 1227, 1242, 1257, 1272 are used to return execution of the email processing to the next stage so that the email is completely processed. Step 1230 checks to see if any audio files are attached to the email message. Audio file attachments may be in any suitable format such as WAV or VOX. If one or more audio files are found attached to the email, they are extracted from the email at step 1235. Each extracted audio file is then published at step 1240 in the manner as described with reference to FIG. 11. The system then checks to see if any image files are attached to the email at step 1245. If one or more image files are found, they are extracted at step 1250. Each extracted image file is then published at step 1255 in the manner as described for each fax page with reference to FIG. 10. The system then checks to see if any other files are attached to the email at step 1260. If one or more files are found, they are extracted at step 1265 and published at step 1270 in a manner that will be discussed next.

It is preferable for the system to allow a user to publish files other then image or audio files. This can be accomplished by; a) extracting the file attachment from the email, b) saving the file in the users storage area, and c) adding a reference for the extracted miscellaneous file to the email messages' webpage and/or the emails' TOC webpage. Using this method, files such as database, spreadsheet and program files can be published using the system. To review or access one of these miscellaneous files, the reviewer would simply select the reference corresponding to the file they desire. To allow a reviewer to discern one file from another, the title of the references listed on the webpage may be labeled with the name of the file attachment. If more then one miscellaneous files are attached to the email, they are extracted one-by-one and published in the manner described above and saved in the users storage area. It is preferable that the system create a TOC webpage if the email message contains multiple parts, such as multiple file attachments. Each reference in the emails' TOC webpage could correspond to each respective sub-message or other part of the email. The webpage used to list the references of the email may be a created from a template webpage as previously discussed.

In addition, the system could publish video files that are attached to the email in a manner similar to the way it publishes audio messages. The video files could undergo processing to convert the video to a common format such as RealVideo™, AVI or MPEG. Additional processing, such as to optimize the video for smooth playback when reviewed on varying connection bandwidths, may also be performed and will be apparent to those skilled in the art. References to the video file(s) could be placed on one or more webpages as discussed with reference to audio file references. The resulting video file(s) and webpage(s) would then be moved to the user's storage area, allowing the video message to be reviewed.

Step 1275 checks to see if there is any text in the body of the email message. If no body text is found within the email, processing of the email message is completed at step 1280. If body text is found, it is extracted from the email at step 1285. Step 1290 creates a new webpage and embeds the extracted body text within it. The webpage used to host the body text may be created from a template webpage as previously discussed. The system then moves the resulting webpage(s) and file(s) to the user's storage area at step 1295, allowing them to be reviewed.

Information contained in the email, the user's preferences or the reviewers' preferences may be used to determine how the email and any attachments are to be published. The user or reviewers preferences could dictate other processes as well. For example, the users account could be setup so that any attached image files should first be processed with OCR to extract ASCII text and publish the extracted ASCII text instead of the image. The command(s) extracted at step 1220 can not only specify simple commands, such as if the message is new or an updated to an existing message, but it can also specify complex instructions. For example, there could be a command that instructs the MPS on what webpage template should be used for publishing each attachment or for publishing the body text of the email. Other commands, processes and variations will become apparent to those skilled in the art after practicing the invention.

Even if a portion of a message doesn't undergo a conversion, the message in its entirety has. For example, let's say a user attaches a GIF image that they wish to publish to an email message. When the system publishes the email message, it may simply just create a webpage to host the attached image and not convert the image file at all. However, even though the image file was not converted, the over-all message was converted from an email compatible format into a webpage compatible format. In addition, if the user later wishes to update the image message, they could simply email the system with an updated image file with the same filename as the first. Because the new image filename is the same as the original, no modification is needed to the hosting webpage. The system could simply replace the original image file with the new one, effectively publishing the new message.

Up until now, the conversion and publishing processes have been described as occurring at the time the message is received by the system. This is commonly referred to as a synchronous mode of operation. Later, when a request for a message is received by the MPS, the message has already been converted into one or more webpages, so the MPS need only retrieve the message file(s) from user's storage area and transmit the message to the requestor. However, the publishing processes can occur at other times as well. For example, when a message is received, it may immediately be stored in its native format, without conversion. into the users storage area. Later, when the message is requested, it could then be converted and published after it is retrieved from the storage area but before it is sent to the requester. Alternatively, the conversion and publishing processes may occur after the message is sent to the requestor. When a message is published after it has been received and stored, the MPS is said to be operating in an asynchronous mode of operation. In this mode, the publishing processes are not immediately performed when it is received. Instead, the publishing processes may occur as a result of some other action or condition, such as when a request is made for the message or some other event or independent process.

The system could be configured to publish or make a message only available on a time and date schedule. For example, a deli owner may wish to fax in tomorrow's breakfast specials now, but doesn't want the fax to be published until tomorrow morning, the appropriate time for it to be made available. Using the scheduled publishing method, the deli owner is free to fax in the specials when it is convenient for him to do so without having to wait until the actual time the fax should be viewable. A delayed publishing schedule can also prevent accidental postings. For example, if the deli owner faxes on Monday the specials for Tuesday, but Monday night realizes that they ran out of one of the items, he can resubmit an updated posting that will supersede the posting he submitted earlier. The reviewers would just see the later-submitted posting on Tuesday and be unaware that the posting was ever corrected.

In addition, the system could be configured to selectively make different messages unreviewable on a date and/or time schedule. Let's say a deli owner has different specials for each day of the week. Lets also say that he submitted all the specials to the system and configure the system to only display the special applicable for each day. The system could then make all non-applicable daily specials unreviewable by requestors by hiding the links to all the non-applicable specials, or by copying the applicable day's special webpage to a default page such as "index.html" so the reviewer will be presented with the appropriate day's special when they visit the deli's website. Alternatively, the system need only maintain the references so only the applicable document for the day is referenced by the "Today's Special" link on the deli's homepage.

The date and/or time to make a particular message unreviewable could be set by the user or automatically set by information contained in or associated with the message itself. For example, the system could scan a message looking for any date or time mentioned in it. If it finds a date or time within the message, it could configure itself to display the message at that date and time. In the example of "Today's Special", if the message contained "Today's specials for Monday, Jan. 5, 1999", the system could automatically display that message for only that day. A repeating schedule could also be setup for any given message. For example, the message MondaySpecials.html can be configured to only be reviewable on Mondays.

The preferred mode of publishing a message depends on various considerations and requirements. For example, when a message is expected to be reviewed a thousand times for each time it is published, it may be more efficient for the publishing processes to occur when the message is received as opposed to when it is requested. This may be preferable because the publishing processes would only need to occur once (when the message is received), rather then the thousand times it will be requested. However, if a message will be updated frequently but reviewed infrequently, it may be more efficient to publish the message when it is requested. Technologies such as Microsoft's ASP (Active Server Pages) and CGI may be used to perform the publishing processes in real-time when a message is requested or as its being send to the requestor. Alternatively, it may be desirable to perform some publishing when a message is requested, regardless of how many times it will be published or requested. For example, let us say a beachfront restaurant owner wishes to have a weather report added to his webpage. It would be undesirable to immediately place the weather report into the message's webpage when it is received, because the weather report would only be accurate for the day the message was published. However, if the MPS is configured to add the current weather report to the message's webpage when it is requested, each requestor would then be presented with the current day's weather report.

A message could undergo different publishing processes at different times. Some processing may occur when the message is received but before it is stored, other processing could occur after it is stored but before it is requested, more processing could occur when the message is requested but before it is sent to the requester, and still other processing can occur after the message is sent to the requestor. For example, when a fax message is received, it may be converted into its respective full and reduced size images. Later, when it is requested, the webpages to host the full and reduced images could be created on the fly based upon the user or reviewers preferences. Some publishing processes may even occur on the requestors' computer or reviewing device. In this example, the message may stay in an unpublished format from the time it is received by the system to when it reaches the requestors' computer or reviewing device. Software (such as but not limited to XML RPC Remote Procedure Call) running on the requesters' computer could then perform the publishing and/or conversion, allowing the requestor to review the message. The point at which the publishing processes occur can be dictated by the user or requestors' preferences and the system is not limited to any particular method or time period.

As described above, the publishing of a message can occur at anytime from when the message is received by the system up to when it is being reviewed. It will also be apparent to those skilled in the art that the system is not limited to the particular file formats mentioned herein. Any suitable file format can be used. For instance, a fax page may first be converted into an intermediate format, or it may be converted directly into the GIF format. Further, instead of GIF, the facsimile messages may be converted into JPEG, JPEG 2000, BMP, PCX, PIF, PNG (Portable Network Graphics), SVG (Scalable Vector Graphics), HTML, ASP or any other suitable type of file format.

The references or links that are placed within a webpage can be either inline, hyperlinks or both. For example, a non-inline reference to an audio message will require the reviewer to select the link or reference before the audio file is transmitted to the reviewer. However, if an inline reference was instead made to the audio file, the audio file could start playing to the reviewer as soon as they request the webpage that hosts the audio message.

Regardless of when the publishing occurs, the message typically needs to be stored in a storage area and available when a request for it is made. Preferably, an Internet server is used for the storage area because it is perfectly suited for storing the message, receiving requests for the message, and transmitting the message to the requestor over the Internets' World Wide Web.

The collection of webpages for a user are commonly referred to as the user's 'Website'. In the preferred embodiment, the files for each user are stored in a separate storage area (or "directory") assigned to just that user. However, it may be preferable to publish messages from different users in the same storage area. For example, lets say the system is being used as a public service such as for posting messages of lost pets. It would be preferable to place such postings in the same area so people have a one-stop place to review the various lost pets. The sender of a new posting could simply specify that their message should go to the area of 'www.easywebs.com/lostpets'. This location could easily be designated by a number ID or other means. The system would then simply add the sender's message to any already existing lost pet postings in that location. This type of centralization makes it very easy for someone to review all the publications related to a specific topic or category.

Each user storage area may also be a sub-directory of another storage area. For example, if the main directory for the system is named "easywebs", and its URL is 'www.easywebs.com', a user directory of "joesdeli" could then be located at 'www.easywebs.com/joesdeli'. Using this method, each user would not have to register and maintain a top-level domain name with a global domain registration service such as Internic. Only the system's single domain name of "easywebs.com" needs to be registered. Each user subdirectory would then be managed by the system itself. The users' storage area, however, may be organized in other ways with the files for one or more users being stored in the same or different directories or locations.

When there is more then one user of the system, an identification means is preferred so the system can determine where and how to publish a message based on the user's preferences or the message being sent. The messages' destination could also be determined from information contained in, accompanying or associated with the message the user is publishing. The various methods of identifying a user and the messages' destination location are explained in more detail throughout this document.

When publishing a message, the MPS would preferably allow the user to publish it as a new message so it is added to the user's existing messages, or publish it as an update so that it would replaced an existing message. In addition, it is preferable for the system to allow a user to delete a message, such as a coupon message that has expired.

When a user wishes to add a new message to their already existing messages, the files for the new message need to have unique filenames so they will not overwrite files of any existing messages. The System may use a simple incremental search scheme to find a unique filename. For example, lets say two audio messages (audio-1.wav and audio-2.wav) already exist in the users storage area, and a new one is to be added. In this example, the system may scan the users' storage area, first searching for an audio file named "audio-1.wav". If it is found, the system increments the filename and tries next scanning for the filename 'audio-2.wav'. If that it found, it searches for 'audio-3.wav' and so on. When the system comes across a filename that does not already exist, it can safely use that filename for the new audio message.

The various files for a message may be identified with any suitable filename. In the preferred embodiment, the first part of the filename describes the type of message, such as "F" for fax messages. The next part of the filename may be sequentially determined according to the number of messages existing for a user. If a message contains more then one part, such as with a multiple page fax, it is preferably that the filename also contains one or more digits describing the portion of the message that the file is part of. For example, the filename "F1P1.GIF" would indicate an image file of page one of the first fax message. Each file of a message may be saved with an extension defined by the format of the file. Thus, the files may end with an extension of ".GIF," ".HTML," ".ASP," ".WAV," or ".RA" according to the format of the particular file.

In another example, if a user wishes to replace an existing fax message with a newer one, the system could simply name the new fax files with the same names as the files for fax message being replaced, so the previous fax files would be overwritten with the newly generated files. In the event that the previous fax message had more pages then the new fax message, the MPS could delete the excess pages of the old fax message. Alternatively, the MPS could simply delete all the files for the previous message before saving the new fax messages' files.

The user could also specify the filenames for the various parts of a message. For example, when using a telephone, the user could specify the filenames using the DTMF digits of the telephone, or by using Speech Recognition, the user can simply say the names of the files. In addition to filenames, the user could even dictate the title for a message that will appear in a table-of-contents webpage. Any hyperlink, file, directory, etc. can be named by either the user or be automatically determined by the system.

Typically, to review a published message, a requestor would request the message by some unique ID. From hereon I will refer to this unique ID as the message's 'Retrieval Address'. For webpages, this Message Retrieval Address (MRA) is often referred to as a URL (Universal Resource Locator) address or web address. For example, to request the document "specials" that is located in the 'joesdeli' sub-directory of the domain 'easywebs.com', you would enter the URL of 'www.easywebs.com/joesdeli/specials.htm' into a web browser. Alternatively, if you wanted to access a message on a local area network, the messages' address might be '\\server\joesdeli\specials.doc', which is commonly referred to as a UNC (Universal Naming Convention) address. The messages' retrieval address typically contains the address of the messages' storage location along with the messages' filename. However, the messages' retrieval address does not need to contain both types of information. For example, the retrieval address of 'www.easywebs.com/joesdeli' contains only the storage area information, but in fact it will retrieve the filename of 'www.easywebs.com/joesdeli/index.html' because most web servers present the requestor with a default message if a specific message was not specified.

A reviewer could access a portion of a message without requesting the message's hosting webpage. For example, lets say the webpage "Specials.html" has a link to an image of the fax message named "F1.GIF". Typically the reviewer would access the specials.html using a Message Retrieval Address such as 'www.easywebs.com/joesdeli/specials.html'. However, the user could also access the fax image directly by using a MRA such as 'www.easywebs.com/F1.gif'.

The storage area would preferably contain the data indicating the preferences of each user or reviewer. For example, when a facsimile message is retrieved by the Internet Server 1360, the Internet Server could ascertain, from the data in the storage area, the preferred option of displaying the facsimile message and would generate the appropriate webpage(s) to those preferences.

The system, however, is not limited to the disclosed naming convention but can encompasses other conventions that will be apparent to those skilled in the art.

A block diagram of the MPS 100 is shown in FIG. 13. As shown, the telephone network and the Internet 130 are connected to an input/output device 1320 that in turn is connected to a central processor 1340 and an Internet server 1360. The number of telephone lines and the capacity of the Internet connection may be changed to any suitable capacity that would be necessary to accommodate the anticipated number of respective telephone calls and Internet activity that may be sent and received by the MPS. The input/output device 1320 routes data back and forth between an open port of the central processor and either the telephone network or the Internet 130. The input/output device may also route data back and forth between the Internet Server 1360 and the Internet.

The central processor receives messages and stores the messages in the storage area 1350 in accordance with software 1330. Preferably, a separate directory in the storage area is established for each user having an account on the MPS so that all the messages for a single user will be stored in the same directory. It should be understood that the number of processors within the central processor is dependent upon the desired capacity for the MPS. With a large number of users and/or requestors, the central processor may actually comprise a number of computers. The input/output device may then function to route the incoming user messages to an available computer within the central processor.

Figure 14:
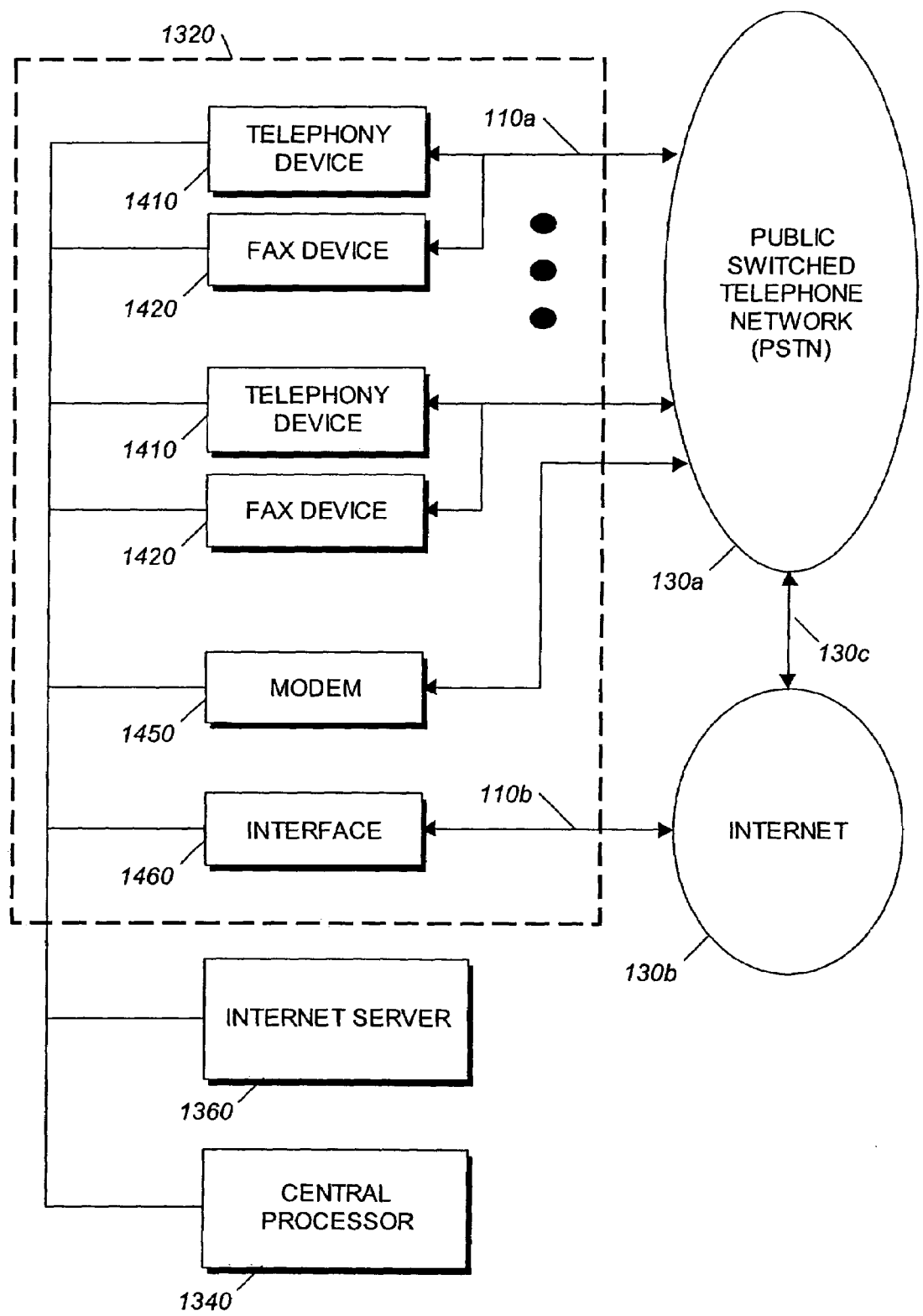
FIG. 14 illustrates a more detailed block diagram of the input/output section.

A more detailed diagram of the input/output section is shown in FIG. 14. The input/output 1320 comprises a number of telephony and fax devices for each telephone line 110a that is connected to the telephone network 130a. In addition, the input/output may comprise a modem or other interface suitable for connecting the central processor 1340 and the Internet Server 1360 to the Internet 130b either directly 110b or through the telephone network 130a. The telephony devices 1410 provides the ability to detect certain ID signals, play announcements, record audio messages and detect DTMF tones. The fax devices 1420 provide the ability to receive other ID signals and fax messages. The telephony and fax devices are connected to a bus that routes the data and signals to and from the central processor. The central processor also comprises a connection to the Internet 130b, such as through its own node or portal using an appropriate interface 1460 or by using a modem 1450 going through the telephone network 130a. The system, however, may be practiced with any suitable connection to the Internet 110b, such as through an intermediate Internet access provider. An Internet connection may also be establish through 130c via the telephone network 130a to the Internet. The Internet connection allows the MPS to send and receive email, fax, audio, video and other files and data using a variety or data transfer protocols. The Internet connection also allows the Internet Server 1340 section of the MPS to receive requests for messages and send the messages to the requesters.

The central processor uses the various ID signals to identify the user sending the message and store the message in the appropriate storage area. As discussed above, the central processor may comprise a number of computers or, more precisely, a number of microprocessors with each microprocessor handling a certain number of simultaneous incoming messages or requests. The microprocessor may comprise any suitable microprocessor, but is preferably at least a Pentium based PC.

In addition to handling incoming messages and storing the messages in the storage area, the central processor also coordinates the interactive voice response system of the MPS. Many software development tools, such as Artisoft's Visual Voice™, can allow even intermediate programmers to create sophisticated telephony applications. Based upon the above-referenced flowcharts and the respective descriptions, the production of the software 1330 is within the capability of one of ordinary skill in the art and will not be described in any further detail.

The Internet Server 1360 is connected to the central processor 1340, such as through a local area network, and has access to the storage area 1350. The Internet Server performs a number of functions according to software 1370. For instance, the Internet Server may retrieve unconverted message files stored in the storage area by the central computer and convert the files into the appropriate webpage(s). The converted webpage(s) may then be stored in the storage area. The Internet Server may also handle requests from requestors, which might require the retrieval of files from the storage area and possibly the generation of additional webpages.

The software 1370 for the Internet Server would therefore incorporate the flowchart of operations for generating webpages according to user or reviewers' preferences and the type of message to be published as discussed previously. Based upon the above-referenced flowcharts and their respective descriptions, the production of the software 1370 is within the capability of one of ordinary skill in the art and need not be described in any further detail. The software for the Internet Server may also include TCP/IP or other transport layers. Moreover, while the authentication is typically provided through a hypertext transport protocol daemon, the authentication process for private messages may be supplemented or replaced with other ways of authentication.

The Internet Server 1360 runs on a suitable operating system (OS), which is preferably an operating system suitable for use on an internet server, such as Microsoft's Internet Information Server (IIS). The Internet Server has a number of application programs, such as the ones depicted in the flowcharts discussed above, for communicating with the central processor and for accessing data from the storage area and for handling requests for messages from requestors.

The Internet server is not limited to the structure shown in FIG. 13, but may comprise additional components. For instance, the Internet Server may be connected to the Internet through typical phone lines, ISDN lines, a T1 circuit, a T3 circuit, or in other ways with other technologies as will be apparent to those skilled in the art.

Furthermore, the Internet Server need not be connected to the Internet but may be connected to other types of networks. For instance, the Internet Server, or more generally the network server, could be connected to a large private network, such as one established for a large corporation. The network server would operate in the same manner by converting messages into webpages, receiving requests for the message from requesters on the network, and by transmitting the message to the requestor.

In addition, at least one interface circuit could be located between the Internet Server and the central processor in order to provide communication capabilities between the Internet Server and the central processor. This network interface may be provided within both the Internet Server and the central processor or within only one of the Internet Server or central processor.

The system can receive messages of varying types from a plurality of users and can receive a message from more then one user at a single time. The messages are stored by the MPS and can be reviewed by multiple simultaneous requestors at the requesters' convenience at any time by connecting to the Internet. The Internet World Wide Web is a constantly expanding network that permits a requestor to review a user message from virtually any location in the world. Since the requestor only needs to incur a local charge for connecting to the Internet, the requestor can retrieve or review a user message at a relatively low cost.

While the invention has been described with reference to a preferred embodiment (although various preferred embodiments of the present invention have been described herein in detail), it is not intended to be exhaustive or to limit the invention to the precise form disclosed. It will be understood (appreciated) by those skilled in the art that variations may be made thereto without departing from the spirit of the invention or the scope of the appended claims. One skilled in the art will recognize that other features may be supported by the apparatus of the invention. For example, the software 1330 and software 1370 are not limited to the exact forms of the flowcharts shown but may be varied to suit the particular hardware embodied by the invention. The software may comprise additional processes not shown or may combine one or more of the processes shown into a single process. Further, the software may be executed by a single computer, such as a Windows-based PC, or may be executed by a larger number of computers.

Furthermore, the requestor may be provided with a greater or fewer number of options in reviewing or retrieving messages. The options are not limited to the exact forms provided but may permit the requestor to review or retrieve the messages in other formats. The options may also permit a requestor to print out two or more messages in one step instead of having to request each one separately.

Also, the various menus provided to the user over the telephone may have a greater or lesser number of options and the MPS may accept responses that involve more than just a single DTMF digit. The specific DTMF digits disclosed in the various menus are only examples and, as will be apparent to those skilled in the art, other digits may be used in their place. For instance, a "9" may be used in the place of a "*" in order to exit the menu or to return to a previous menu. In addition, the DTMF digits may be changed in accordance with the user's personal convention. If the user is familiar with another IVR system, the user could customize the commands to correspond with the commands used in the previous system in order to provide a smooth transition to the MPS.

The MPS may restrict a user so they can only publish certain types of messages. For instance, a user may want the MPS to accept only facsimile messages in order to reduce the costs of using the MPS. In such a situation, the MPS would perform an additional step of checking that the type of message a user is sending is an authorized type for that particular user. If a message is unauthorized, the MPS may ignore the message entirely or the MPS may inform the user that the attempted message is invalid.

Moreover, the MPS has been described as having the central processor for processing messages and the Internet Server 1360 for handling requests. The invention may be practiced in various ways other than with two separate processors. For instance, the central processor and the Internet Server may comprise a single computer or workstation for handling the incoming messages and requests, and for interfacing with the Internet. The Internet Server may convert the messages into webpages prior to sending the messages to a requester. In addition, the central processor may communicate with the paging system 1300 instead of the Internet Server. Additionally, as discussed above, the central processor may comprise a number of microprocessors for handling a large number of simultaneous users and/or requests.

The invention has been described as converting the messages into webpages and transmitting the webpages over the Internet to the requestor. Preferably, the HTML format is used to create the webpages. The HTML format, however, is only one preferred format for exchanging information on the Internet and is actually only one type of a Standard Generalized Mark-Up Language. As will be apparent, the invention is not limited to presenting messages on webpages, any method that can present the message for review by a requestor can be used.

The system could be used to publish messages in combination with traditional web publishing methods. For example, let us say a user has a large website (that was created and is currently being maintained using traditional methods) and they sell products whose prices change everyday. Using traditional methods, it may be impractical or too expensive to have a webmaster update the webpage everyday to reflect the current pricing. Because, even in a big company, there are usually only a few webmasters, and they are unable to perform every single beneficial change to the website. Many changes go undone because they become a lower priority or lost in the red tape typical of large corporations. However, by configuring the system to maintain just the price webpage, the process becomes both easy and economical. Because the system can be used by a non-technical person, many more people can update the website that normally wouldn't be able to. In addition, the user can continue to use traditional web publishing methods to maintain the rest of their website. Alternatively, the system could be configured to simply convert the received price list into a GIF image and place the GIF image on the users web server. The user would then simply create a webpage that references that GIF image. Using this method, the user has full, independent control on creating and maintaining the webpage that hosts the GIF image that the system will continuously update.

The system is not limited to using a disk directory for storing the users' messages. A database can also be used as the storage area. Then, when a request is received, the message can be extracted from the database, published and presented to the requestor using any one of the methods mentioned herein. In should also be know that different portions of the message could be stored in different storage locations. For example, the GIF images of a fax message could be stored in a database, but the webpage to host them could be stored elsewhere or created on the fly when the webpage is requested.

As mentioned previously, a message can be published in separate steps that occur at a different times. For example, each page of a fax message could first be converted into GIF images and saved into the users storage area. The hosting webpages could then be created on the fly when the message is requested. Technologies such as CGI and ASP can be used to create webpages in real time. Using this method, up-to-the-minute information, such as weather reports or stock quotes can be presented to the reviewer along with the message. Alternatively, the system could perform the message conversion after it is stored, but before the message is requested. In this example, a background task could asynchronously extract the unpublished message from the users' storage area, perform one or more publishing processes, and place the fully or partly published message back into the users' storage area.

The storage area and/or the destination of a users' message can be dictated by the user when they are publishing the message, by the users' default preferences or by the system itself. For example, the system may default to placing a published message in the user's default storage area if the user did not specify another location when they published the message. However, it may be preferable for the system to allow the user to specify an alternative storage area when they are publishing a message. Using this method, a user could maintain more then one webpage or account on the MPS. For example, a user who owns a deli may want separate breakfast and lunch menu webpages. The breakfast webpage could be designated as storage area number 1, and the lunch webpage as location #2. By being able to specify the storage location when they are publishing a message, the user can choose which webpage to update.

The system is not limited to just using a storage area owned by the system. The system could publish a users' message in a storage area owned or operated by a third party. For example, a user may already have a website hosted by a third party but wishes to use the system to update one or more pages on their website. The system could be configured to save the users' published messages to the third party's web server by sending the message to the third party server using a protocol such as FTP (file transfer protocol). If the third party server requires a username and password before it will accept any files, the system could be configured to supply such info each time that a message file needs to be transferred to the third party server.

With regard to the transmission of messages to the requestor, the MPS can permit the requestor to sample an audio message or to preview a facsimile/image message without requiring the MPS to transmit the entire message to the requester. This is a significant benefit since the transmission of the entire message would frequently tie up the requesters' computer or viewing device for a rather long period of time. Thus, with the preview or sample feature, the requestor can determine whether they need the entire message transmitted to them. If the requestor does decide that the entire message needs to be transmitted, as stated above, the requestors' computer or reviewing device might be receiving the message for a relatively long period of time. After the entire message has been received, the requestor then has the options of viewing, listening, printing, retrieving, or saving the message. As an alternative, the requesters' computer or reviewing device may instead indicate the contents of the message to the requestor as the message is being received. For instance, with an audio message, the requesters' reviewing device could send the message to an audio speaker as the message is being received. In this manner, the message would be played in real time and the requestor would not need to wait until the entire message is received before listening to the message. In order to play the messages in real time, the messages are preferably in a streaming format such as the RealAudio (RA) format, which the requester can select as the preferred format for audio messages. In operation, the MPS would transmit a webpage containing a reference to an RA file. If the requestor selects the RA file with the browser on the requestors reviewing device, the browser will activate a program for use with RA files. The operations and functioning of this program will be apparent to those skilled in the art and will be available as a separate software package or will be incorporated within a browser program. The RA program will request the RA data file containing the message from the MPS and, as the RA file is being received at the reviewing device, this program will play the message in real time.

The system has been described as being able to store and transmit audio messages. It should be understood that the voice message would probably be the most often type of audio message stored at the MPS. The system, however, may be used with any type of audio message and is in no way limited to just voice messages.

Video messages can also be easily published by using the same publishing methods as described for audio files. Various formats for video files exist such as Real Video, AVI, MPEG that can be published by the system either as file attachments to an email or transmitted over a network such as the PSTN or the Internet. For example, common video conferencing protocols can be used to transmit a video message over a data network, such as the Internet. It should also be apparent that the system is not limited to any particular method used to send or receive a video message. For example, videophone type devices may be used to publish video messages by sending a video message to the system through the PSTN.

It would also be preferable for the system to automatically create hyperlink references to the various files that may exist for a user. For example, let us say a deli owners' homepage includes the phrases "Breakfast Menu" and "Lunch Menu" and there are files named "breakfastmenu.html" and "lunchmenu.html" in the users storage area. It would be preferably for the system to automatically add a hyperlink to the mentioned phrases so the reviewer can simply select the phrase on the homepage and be presented with the respective webpage. Technologies such as OCR and SR could be used to convert the words in image and audio files into ASCII text and scan the text to see if any phrase matches with existing filenames. When a match is found, the system could automatically create a hyperlink reference between the phrase and the file. Text of an email message could also be scanned for matching phrases and filenames. In addition, the system could scan the text contained in each webpage or a users' website and create hyperlinks between common word phrases. For example, if two users webpages contained the phrase "Common Problems", the system could create hyperlinks that reference each other. Using this method, a reviewer looking at one webpage could easy see that another webpage contains the same phrase even if the other file's name is not "common_problems.html", and by simply clicking on the phrase's hyperlink, the reviewer is presented with the second webpage that contains that same phrase. With still another method, the system could scan the various messages and extract the first sentence from them. This first sentence could be used as the title for the message. The titles could then be added to a TOC webpage so that each reviewer can get an idea of each message's topic. Using these methods, the system could automatically create hyperlinks between various related topics that will allow reviewers to navigate through a user's website without the user having to manually add the hyperlinks.

It is also preferable for the system to offer the reviewer the option of re-organizing or re-formatting the presentation of one or more messages so they can be printed out or saved by the reviewer in a desired manner. For example, audio messages could be converted to ASCII text so they can be printed out or saved in a memory area much smaller then would be needed to save the original audio message, or because the reviewer does not have audio playback capabilities. Alternatively, a fax message could be resized so each page fits on a normal 8.5"×11" piece of paper when printed out.

The embodiment was chosen and described in order to explain the principles of the invention and their practical application so as to enable others skilled in the art to utilize the invention and various embodiments and with various modifications as are suited to the particular use contemplated. The system is not limited to the described conversion and publishing processes or to the particular software or hardware used in these processes. One skilled in the art will recognize that other features can be supported by the apparatus of the system. In addition, it will also be apparent to those skilled in the art after reading this document that the invention is not limited to any particular method used to send a message to, or retrieve a message from the system.

Finally, in essence, the invention allows virtually anyone to automatically create a new website, complete with multiple webpages, by using just a telephone or fax machine. The user of the system will be able to modify their website at anytime using just a telephone or fax machine. The system offers security so only the owner of a website can modify it. The system also automatically submits the user's website to multiple Internet search engines so other people can find the user's published messages.

The invention has been described in connection with certain preferred and other embodiments thereof, but is broader than such embodiments, and instead is defined by the claims appended hereto.

I claim:

1. An Internet message publishing system (IMPS), comprising:
   at least one sender account;
   means for receiving a message over a network from a sender of said message, said message being in a first format;
   means for identifying said sender of said message as an authorized sender based on information associated with said message in comparison to data in the sender account, wherein said identifying means is dependent upon the format of said message;
   means for converting said message from said first format to a second format;
   means for storing said message in at least one storage area;
   means for receiving a request for at least a portion of said message from a requestor, said request being made over the Internet;
   means for retrieving at least the portion of said message from said storage area, in response to receiving said request; and
   means for sending at least the portion of said message to said requestor over the Internet only if said sender has been identified as an authorized sender.

2. The IMPS according to claim 1, wherein said message comprises at least one of an email, an email attachment, audio, a facsimile, an image, and text.

3. The IMPS according to claim 1, further comprising means for sending said message to said IMPS, said sending means comprises a virtual printer driver.

4. The IMPS according to claim 1, further comprising notification means for notifying at least one person in response to said message being published by said IMPS.

5. The IMPS according to claim 1, wherein said converting means comprises a generator in support of an automatic generation of at least a portion of a webpage which has either a reference to at least one portion of said message or at least a part of said message.

6. The IMPS according to claim 1, wherein said converting means comprises means for replacing a keyword contained in an existing file with at least a portion of said message.

7. The IMPS according to claim 1, further comprising addressing means for assigning a retrieval address suitable for retrieving at least one portion of said message using one of information associated with said authorized sender, data in said sender account, information in the at least one storage area, and information associated with said message.

8. The IMPS according to claim 1, further comprising means for sending said message to said IMPS, wherein said sending means comprises a phone.

9. The IMPS according to claim 1, wherein said converting means comprises an automatic extraction means to extract text data from at least one portion of said message.

10. The IMPS according to claim 1, wherein said request is for an XML file which comprises either a reference to at least one portion of said message or at least a part of said message.

11. The IMPS according to claim 1, wherein said converting means adds one of:
   at least a part of said message within an existing webpage, and
   a reference for at least one portion of said message within the existing webpage.

12. The IMPS according to claim 1, wherein said converting means comprises a generator in support of an automatic generation of at least a portion of at least one XML file comprising either a reference to at least one portion of said message or at least a part of said message.

13. The IMPS according to claim 1, wherein said converting means adds one of:
   at least a part of said message within an XML file, and
   add a reference to at least one portion of said message within the XML file.

14. The IMPS according to claim 1, wherein said means for storing performs one of:
   replacement of at least a part of a previous message with at least one portion of said message, and
   addition of the one portion of said message to the previous message.

15. The IMPS according to claim 1, wherein said converting means embeds at least one portion of said message into a file with said second format.

16. The IMPS according to claim 1, wherein said converting means embeds at least one reference to at least one portion of said message into a file within said second format.

17. The IMPS according to claim 1, further comprising advertising means for automatically adding advertisements to: a first webpage containing at least a part of said message, a second webpage with at least one reference to at least one portion of said message, a first XML file containing at least the part of said message, a second XML file with at least one reference to at least the one portion of said message, or within said message.

18. An Internet message publishing system (IMPS), comprising:
   at least one sender account;
   means for receiving a message over a network from a sender of said message, said message being in a first format;
   means for identifying said sender of said message as an authorized sender based on information associated with said message in comparison to data in the sender account, wherein said identifying means is dependent upon a format of said message;
   means for converting said message from said first format to a second format; and
   means for providing at least a portion of said message to at least one third party storage area only if said sender has been identified as an authorized sender,
   a central processor, wherein at least one of said means utilizes the central processor to perform its recited function.

19. The IMPS according to claim 1, wherein said sending means sends at least the portion of said message in the second format.

20. The IMPS according to claim 18, wherein said providing means provides at least the portion of said message in the second format.

* * * * *